US012157025B2

(12) United States Patent
Pigeon

(10) Patent No.: US 12,157,025 B2
(45) Date of Patent: Dec. 3, 2024

(54) FIRE SPRINKLER WITH PRE-DEFLECTOR FLOW SPLITTER

(71) Applicant: Firebird Sprinkler Company LLC, Ann Arbor, MI (US)

(72) Inventor: Jeffrey J. Pigeon, Ann Arbor, MI (US)

(73) Assignee: Firebird Sprinkler Company LLC, Ann Arbor, MI (US)

( * ) Notice: Subject to any disclaimer, the term of this patent is extended or adjusted under 35 U.S.C. 154(b) by 0 days.

(21) Appl. No.: 17/742,697

(22) Filed: May 12, 2022

(65) Prior Publication Data

US 2022/0266079 A1 Aug. 25, 2022

Related U.S. Application Data

(63) Continuation of application No. 16/988,870, filed on Aug. 10, 2020, now abandoned, which is a (Continued)

(51) Int. Cl.

*A62C 31/02* (2006.01)
*A62C 3/00* (2006.01)

(Continued)

(52) U.S. Cl.

CPC .............. *A62C 35/68* (2013.01); *A62C 3/002* (2013.01); *A62C 31/02* (2013.01); *A62C 35/64* (2013.01);

(Continued)

(58) Field of Classification Search

CPC ......... A62C 31/02; A62C 31/05; A62C 37/11; A62C 37/12; B05B 1/267; B05B 1/262; B05B 1/265

(Continued)

(56) References Cited

U.S. PATENT DOCUMENTS 1,288,123 A * 12/1918 Mowry .................. B05B 1/265 239/523
1,667,425 A 4/1928 Loepsinger (Continued)

FOREIGN PATENT DOCUMENTS

DE 1899279 U 8/1964
DE 112006002211 7/2008

(Continued)

OTHER PUBLICATIONS

Globe Sprinkler, Specific Application Attic Sprinklers, GFS-650, Jun. 2019, pp. 1-29.

(Continued)

*Primary Examiner* — Jason J Boeckmann
(74) *Attorney, Agent, or Firm* — Dickinson Wright PLLC

(57) ABSTRACT

A fire protection sprinkler system and method includes a sprinkler which, in use, is operatively connected to a supply pipe. The sprinkler includes a nipple. A frame extends from the nipple. A duct passes through the nipple and frame creating a flow path for a water jet exiting the supply pipe. A deflector is mounted to the frame at a location spaced from the nipple. A splitter is disposed in the water flow path between the supply pipe and the deflector. The splitter separates the water jet into two distinct sub-jets before the water contacts the deflector. The splitter directs the two separate water streams onto the deflector so that less pressure is required resulting in more economical system smaller pipe size, less labor, etc.

30 Claims, 21 Drawing Sheets

Related U.S. Application Data continuation of application No. 16/589,283, filed on Oct. 1, 2019, now Pat. No. 10,940,350, which is a continuation of application No. 16/208,649, filed on Dec. 4, 2018, now abandoned, which is a continuation-in-part of application No. 15/598,808, filed on May 18, 2017, now Pat. No. 10,493,308, which is a continuation-in-part of application No. 15/257,961, filed on Sep. 7, 2016, now Pat. No. 10,149,992, which is a continuation of application No. 14/661,302, filed on Mar. 18, 2015, now abandoned.

(60) Provisional application No. 62/215,058, filed on Sep. 7, 2015, provisional application No. 62/019,527, filed on Jul. 1, 2014, provisional application No. 61/955,253, filed on Mar. 19, 2014.

(51) Int. Cl.
*A62C 35/64* (2006.01)
*A62C 35/68* (2006.01)
*A62C 37/11* (2006.01)
*A62C 37/12* (2006.01)
*B05B 1/26* (2006.01)

(52) U.S. Cl.
CPC .............. *A62C 37/11* (2013.01); *A62C 37/12* (2013.01); *B05B 1/267* (2013.01)

(58) Field of Classification Search
USPC .................... 169/37; 239/523, 512, 518, 601
See application file for complete search history.

(56) References Cited

U.S. PATENT DOCUMENTS 1,796,159 A 3/1931 Pallady
2,211,399 A * 8/1940 Winslow ................ A62C 37/09 169/39
2,291,813 A * 8/1942 Knight ................... A62C 37/14 169/37
2,684,121 A 7/1954 Lim
3,051,397 A * 8/1962 Hanson ................. B05B 7/0056 239/524
3,454,097 A 7/1969 Groos
3,802,512 A * 4/1974 Todtenkopf ............ A62C 37/10 169/37
3,833,062 A 9/1974 Livingston
4,091,876 A 5/1978 Valdatta
4,177,862 A * 12/1979 Bray ...................... A62C 37/10 169/17
4,220,208 A * 9/1980 Jackson ................. A62C 35/64 169/17
4,279,309 A 7/1981 Fischer et al.
4,296,816 A 10/1981 Fischer
4,351,393 A 9/1982 Tyree
4,616,710 A * 10/1986 Pilant ..................... A62C 37/20 169/41
4,624,414 A 11/1986 Ferrazza
4,800,961 A 1/1989 Klein
5,020,601 A 6/1991 Retzloff et al.
5,069,073 A * 12/1991 Barrett ................ G01L 19/0007 73/756
5,097,906 A 3/1992 Polan
5,234,161 A * 8/1993 Harrison, Jr. ......... B05B 15/658 239/550
5,669,449 A 9/1997 Polan et al.
5,722,599 A 3/1998 Fries
5,775,431 A * 7/1998 Ondracek .............. A62C 37/14 169/37
5,829,532 A 11/1998 Meyer et al.
6,098,718 A 8/2000 Sato
6,336,509 B1 1/2002 Polan et al.
6,540,261 B1 4/2003 Painter et al.
6,637,518 B1 10/2003 Hillier et al.
7,137,455 B2 11/2006 Green
7,290,618 B2 11/2007 Thomas et al.
7,611,077 B2 11/2009 Sesser et al.
7,757,967 B1 7/2010 Yang
7,841,418 B2 11/2010 Pahila et al.
8,474,545 B2 7/2013 Takeuchi
8,544,556 B2 10/2013 Sundholm et al.
8,602,118 B2 * 12/2013 Pigeon ................... A62C 37/14 239/524
8,733,461 B2 5/2014 Pigeon
8,905,151 B2 12/2014 Silva, Jr. et al.
9,149,818 B1 * 10/2015 Orr ......................... B05B 1/267
9,302,132 B2 4/2016 Green et al.
9,339,675 B2 5/2016 Koiwa
9,381,386 B2 7/2016 Pigeon
9,849,321 B2 12/2017 Huotari et al.
9,868,005 B2 1/2018 Green et al.
9,874,297 B2 1/2018 Campbell et al.
10,149,992 B2 12/2018 Pigeon
2005/0045739 A1 3/2005 Multer
2007/0256844 A1 11/2007 Blasing et al.
2008/0202773 A1 * 8/2008 Pigeon ................... A62C 35/68 169/37
2009/0218109 A1 9/2009 Sato
2015/0265865 A1 9/2015 Pigeon
2016/0023031 A1 1/2016 Thomas
2016/0375288 A1 12/2016 Pigeon
2017/0113078 A1 4/2017 Magnone et al.
2017/0259095 A1 9/2017 Pigeon
2021/0353988 A1 11/2021 Desrosier et al.

FOREIGN PATENT DOCUMENTS

GB 532837 A 1/1941
WO 2009108944 A2 9/2009
WO 2013148429 A2 10/2013

OTHER PUBLICATIONS

Johnson Controls, Tyco Models BB, SD, HIP, and AP Specific Application Sprinklers For Protecting Attics, TFP610, Aug. 2018, pp. 1-28.
Reliable Sprinkler, Models DD56-6, DD56-27, DD80-6, DD80-27, DS56, GP56, AH42, & AH56 Sprinklers: Specific Application Sprinklers for Attic Spaces, Bulletin 056 May 2019, www.reliablesprinkler.com, pp. 1-26.
Mking Group, Inc., Model V-BB Specific Application Attic Sprinkler Technical Data, Form No. F_042915, Oct. 25, 2018 Rev. 16.2.P65, pp. 1-15.

* cited by examiner

FIRE SPRINKLER WITH PRE-DEFLECTOR FLOW SPLITTER

CROSS REFERENCE TO RELATED APPLICATIONS

This application claims priority to Provisional Patent Application No. 62/019,527 filed Jul. 1, 2014, the entire disclosure of which is hereby incorporated by reference and relied upon.

BACKGROUND OF THE INVENTION

Field of the Invention

This invention relates generally to the fire suppression and extinguishment field, and more specifically to a new and improved fire sprinkler system for use in the fire suppression and extinguishment field.

Description of Related Art

Fire sprinkler systems have been used in the United States to protect warehouses and factories for many years. In a fire sprinkler system, a fire sprinkler is positioned near the ceiling of a room where hot "ceiling jets" spread radially outward from a fire plume. When the temperature at an individual sprinkler reaches a pre-determined value, a thermally responsive element in the sprinkler activates and permits the flow of water as a water jet through a duct toward a deflector. The deflector redirects the water jet into thin streams or "ligaments" that break up into droplets due to surface tension. The water droplets deliver water to the burning material, reduce the combustion rate, wet the surrounding material, reduce the flame spread rate, cool the surrounding air through evaporation and displace air with inert water vapor.

When fire sprinklers are located close to each other, as shown in FIGS. 3 and 4 of my U.S. Pat. No. 8,602,118 (issued Dec. 10, 2013, the entire disclosure of which is hereby incorporated by reference and relied upon), the risk of "cold soldering" becomes a concern. Cold soldering occurs when a first fire sprinkler disperses a fire suppressing or extinguishing substance that directly cools a second fire sprinkler and prevents the second fire sprinkler from properly responding and activating. Thus, there is a need in the fire suppression and extinguishment field to create an improved fire sprinkler that reduces or eliminates the risk of cold soldering. This invention provides such improved fire sprinkler.

BRIEF SUMMARY OF THE INVENTION

According to a first aspect of this invention, a fire protection sprinkler comprises a nipple configured to connect with a water supply pipe, a frame extending from the nipple, a duct passing through the nipple and frame creating a flow path for a water jet exiting the supply pipe, a deflector mounted to the frame and spaced from the nipple, and a splitter disposed upstream of the deflector pro-actively separating the water jet into two distinct sub-jets before the water contacts the deflector.

According to a second aspect of this invention, a fire protection sprinkler system comprises an elongated water supply pipe, and a sprinkler is operatively connected to the supply pipe. The sprinkler includes a nipple configured to connect with a water supply pipe. A frame extends from the nipple. A duct passes through the nipple and frame creating a flow path for a water jet exiting the supply pipe. A deflector is mounted to the frame at a location spaced from the nipple. And a splitter is disposed in the water flow path between the supply pipe and the deflector. The splitter separates the water jet into two distinct sub-jets before the water contacts the deflector.

The splitter directs the two separate water streams onto the deflector so that less pressure is required resulting in more economical system smaller pipe size, less labor etc.

According to a third aspect of this invention, a method is provided for protecting an underlying area with water sprayed from a fire sprinkler. The method comprises the steps of: supporting an elongated water supply pipe below a roof, the supply pipe containing water under pressure, diverting at least a portion of the water in the supply pipe into the nipple of an adjoining sprinkler, passing the water through the nipple as a water jet, routing the water jet through a frame that extends from the nipple toward a terminal end, locating a deflector at the terminal end of the frame and in the path of the water jet, and separating the water jet into two distinct sub-jets before the water contacts the deflector.

The step of separating the water jet into two distinct sub-jets before the water contacts the deflector reduces the pressure required and results in more economical system smaller pipe size, less labor etc.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
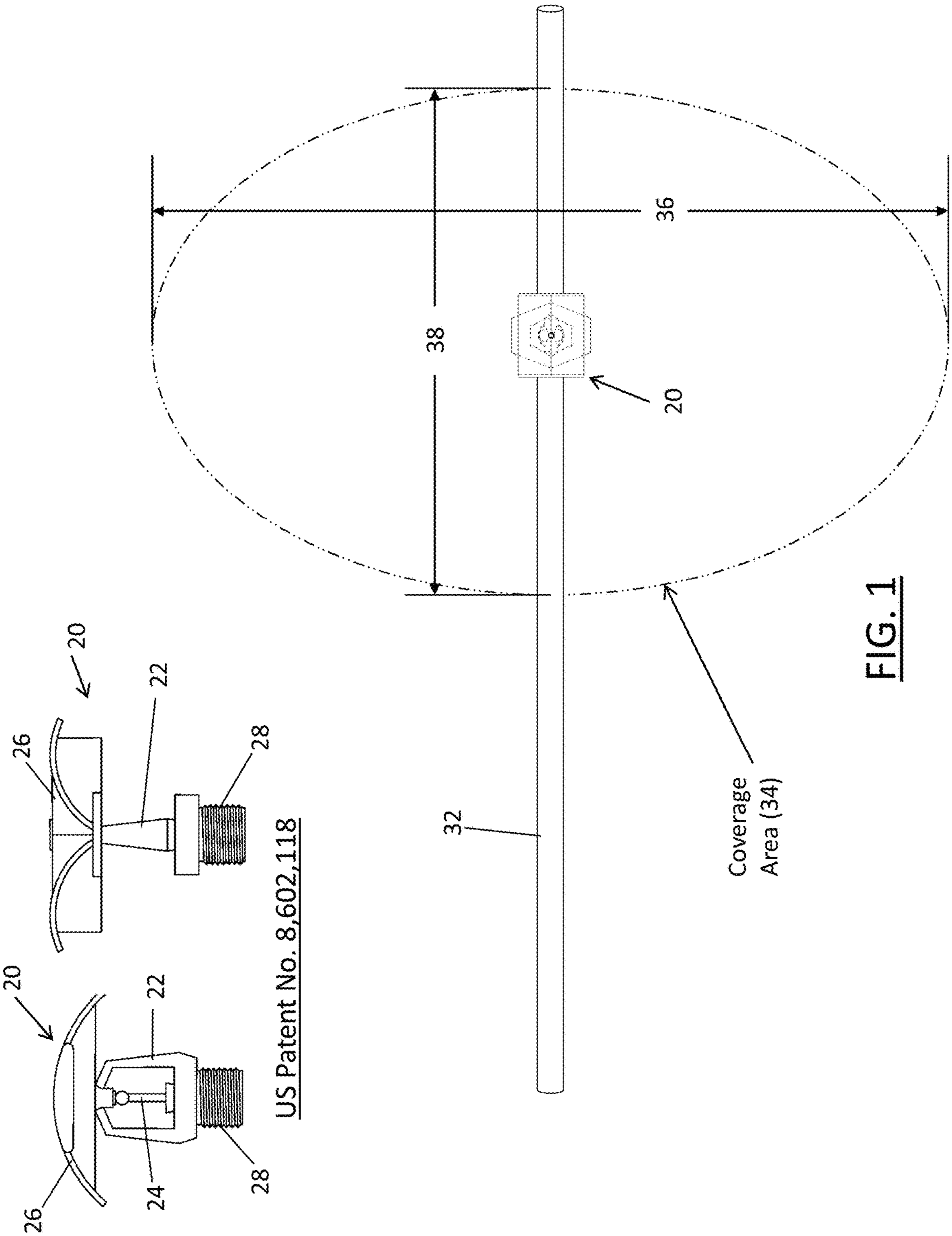
FIG. 1 illustrates views of a preferred sprinkler like that shown in FIGS. 8 and 9 of my U.S. Pat. No. 8,602,118.
Figure 8:
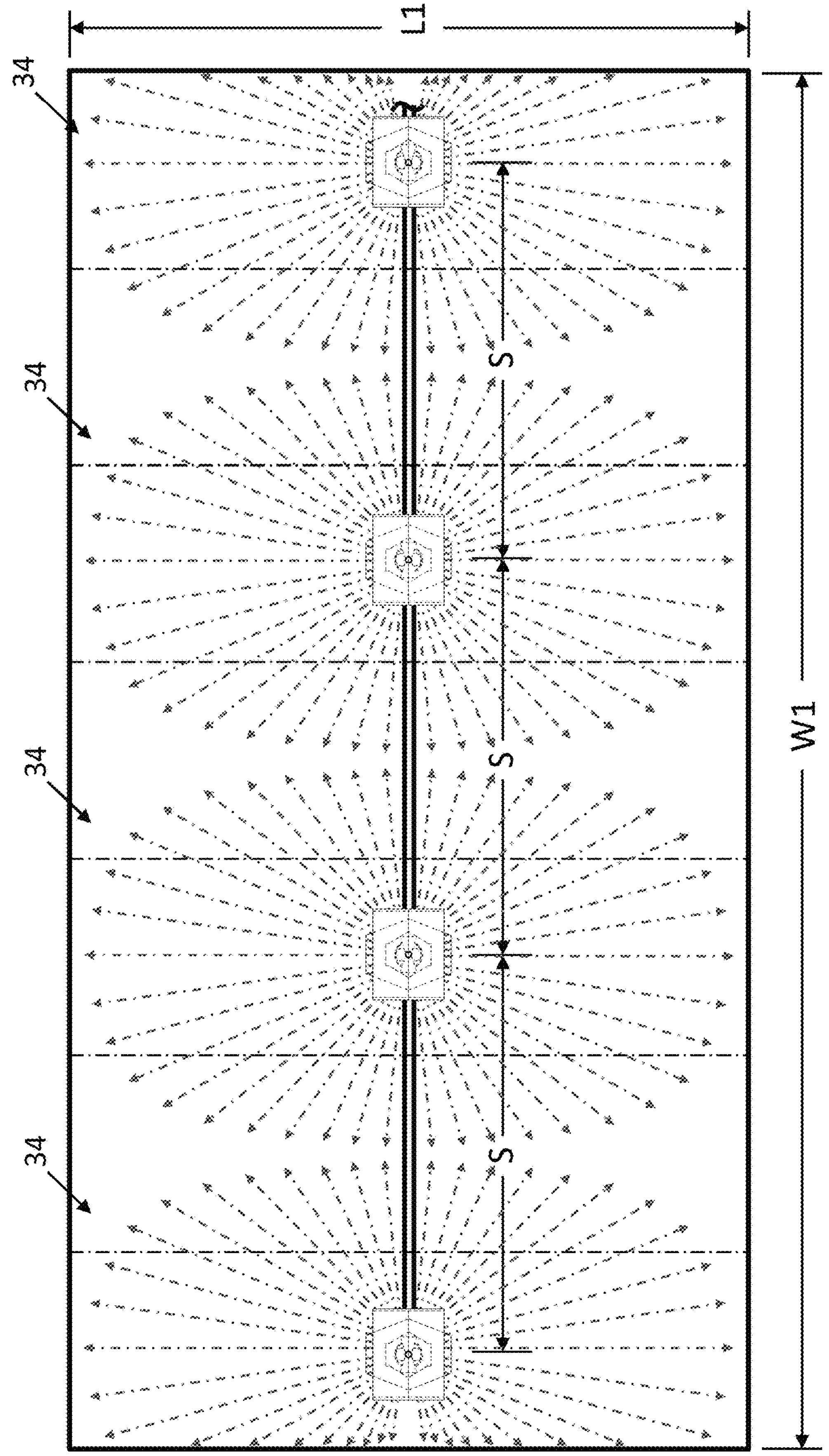
FIG. 8 is a view as in FIG. 7 graphically depicting the underlying coverage area of each sprinkler.
Figure 9:
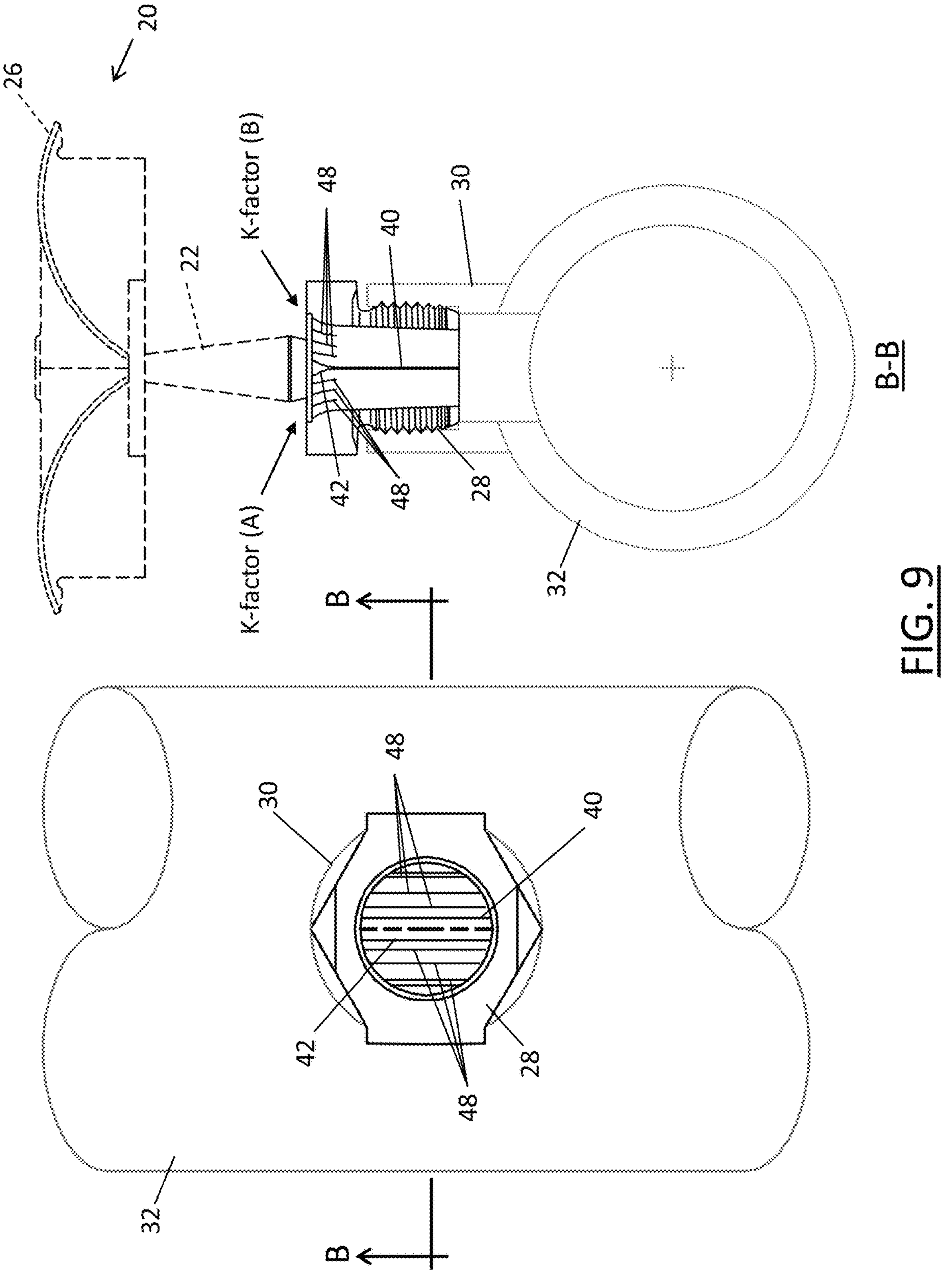
FIG. 9 shows a first alternative embodiment of the present invention in which the splitter includes turning vanes.

Referring to the figures, wherein like numerals indicate like or corresponding parts throughout the several views, FIG. 1 illustrates views of a preferred sprinkler 20 like that shown in FIGS. 8 and 9 of my U.S. Pat. No. 8,602,118. The sprinkler 20 includes a frame 22, a trigger 24, and a deflector 26. A threaded nipple 28 extends from the frame 12 and is configured to be screwed into the threaded saddle 30 of a supply line 32. A duct (FIG. 4) extends through the frame 22 and nipple 28 to create an internal flow path for water or other fire suppressing substance from the supply line 22. The trigger 24 blocks the duct until activated by an elevated internal building temperature. Once the trigger 24 is tripped, water (or other substance in the supply line 32) rushes out under pressure through the duct and collides with the deflector 26 to spray over the designed coverage area.

The sprinkler 20 is shown in FIG. 1 mounted to a water supply pipe 32 in an overhead view. (Of course, the supply pipe 32 could be used to conduct other fire suppressing or extinguishing substance instead of water. For purposes of convenience, water will be referred to throughout this patent application although any form of liquid fire suppressing or extinguishing substance could be substituted therefor.) The deflectors 24 are designed to strategically redirect the flow of the water into a coverage area 34.

The deflector 26 may be configured to redirect the flow of water from the supply pipe 32 over a generally elliptical coverage area 34 having a major diameter 36 and a minor diameter 38. The major diameter 36 is oriented perpendicular to the length of the supply pipe 32, whereas the minor diameter 38 is generally parallel to the supply pipe 32. Preferably, the minor diameter 38 of each coverage area 34 is significantly less than the major diameter 36 of each coverage area 34. For example, the minor diameter 38 of each coverage area 34 may be less than 66% of the major diameter 36 of each coverage area 34. In a second variation, the minor diameter 38 of each coverage area 34 may be less than 33% of the major diameter 36 of each coverage area 34. In a third variation, the major diameter 36 of each coverage area 34 may be at least 20 feet (6 m) and the minor diameter 38 of each coverage area 34 may be approximately 5 to 6 feet (1 to 2 m). In still further alternative variations, the major diameter 36 and the minor diameter 38 of each coverage area may be any suitable dimension.

In the illustrated examples, the deflector 26 includes a complex curvature defining two pairs of arcs, with one arc pair arranged perpendicular to the other arc pair. All four arcs preferably originate near the sprinkler centerline so that a stream of high-pressure/high velocity water emanating from the supply pipe 32 (via the duct in the nipple 28) will strike the deflector 26 and produce generally even elliptical distribution throughout the coverage area 34. The first pair of adjacent arc redirects the flow of water in the direction of the minor diameter 38 (or the "width" dimension) of the coverage area 34, while the second pair of adjacent arcs redirects the flow of water in the direction of the major diameter 36 (or the "length" dimension) of the coverage area 34. The geometries of the arcs (e.g., the height, length, and curvature) are preferably chosen based on the specific application and environment of the sprinkler (e.g., the flow rate of the fire suppressing or extinguishing substance, the distance and height of storage containers in the proximity of the sprinkler, and other suitable factors).

In fire protection engineering, the K-factor formula is used to calculate the discharge rate from a sprinkler 20. The flow rate of a nozzle is given by $$q=K\sqrt{p}$$

Where:

q is the flow rate in liters per minute (LPM), p is the pressure at the nozzle in Bar K (or k) is the nozzle discharge coefficient or k-factor for head This formula can be rewritten to give us:

$$k=q/p^{0.5} \text{ and } p=(q/k)^2$$

For standard type sprinkler heads, many design standards specify standard k-factors and minimum pressure, which can be used for different Hazard classifications and design densities. For all other types of sprinkler heads 20 the manufactures data sheet should be referred to for the k-factor and minimum head pressure.

EN 12845 Specifies the Following k-Factors for Sprinkler Heads

| Hazard Class | Design Density mm/min | K-Factor $Lpm/bar^{0.5}$ | Minimum Pressure bar |
|---|---|---|---|
| Light Hazard | 2.25 | 57 | 0.70 |
| Ordinary Hazard | 5.00 | 80 | 0.35 |
| High Hazard Process | ≤10 | 80 or 115 | 0.50 |
| High Hazard Storage Ceiling or roof sprinklers | >10 | 115 | 0.50 |
| High Hazard Storage In-rack sprinklers | >10 | 80 or 115 | 2.00 |

According to this invention, the elliptical coverage area 34 of the sprinkler 20 can be achieved more efficiently, and in a more balanced manner, by pro-actively dividing the water stream directed at the deflector 26. That is, the water jet emanating from the duct in the nipple 28 is separated into two distinct sub-jets upstream of the deflector 26.

Figure 2:
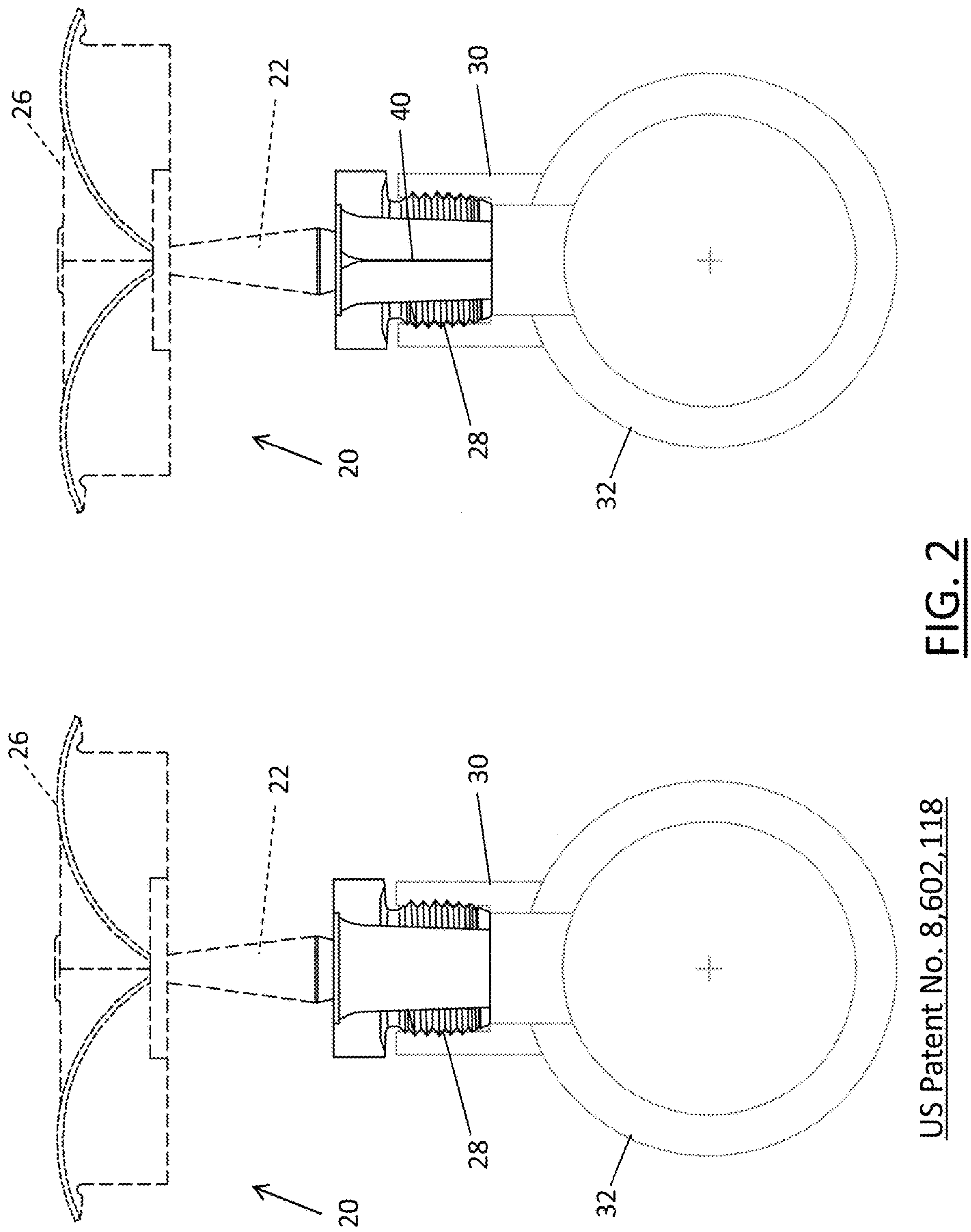
FIG. 2 provides a side-by-side comparison of two nearly identical sprinkler heads.
Figure 3:
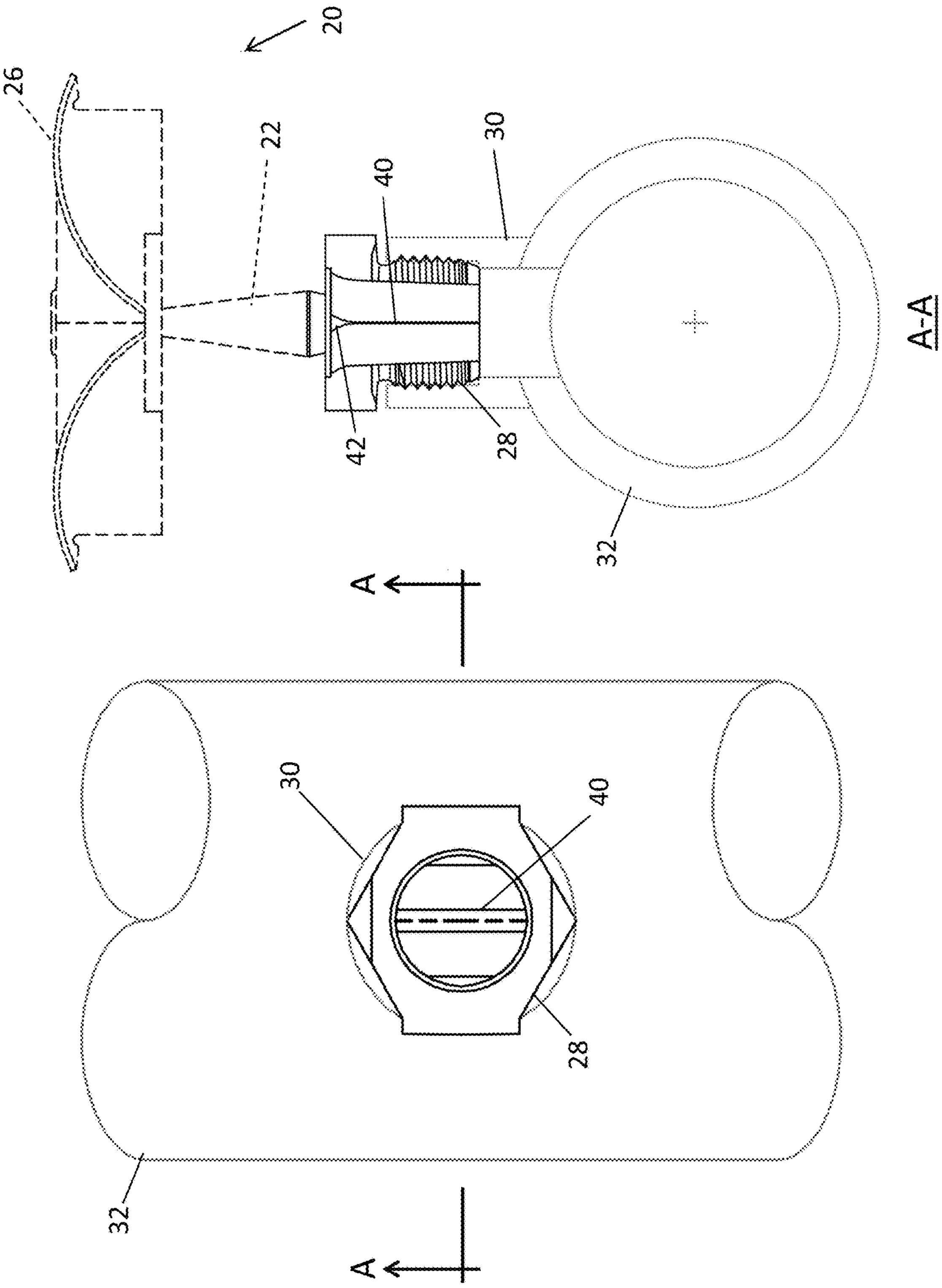
FIG. 3 shows the splitter disposed along the axial centerline of the nipple orifice and separates the exiting flow of water into two separate flows of water.

FIG. 2 provides a side-by-side comparison of two nearly identical sprinkler heads 20. The sprinkler 20 on the left does not include any feature for pro-actively dividing the water stream emanating from the nipple 28, whereas the sprinkler 20 on the right does. As can be seen in FIG. 3, a splitter 40 is positioned inside the duct of the nipple 28. The splitter is oriented parallel to the supply pipe 32 such that two sub-jets of water (see FIG. 5) diverge as they flow toward the respective arcs of the deflector 26. Each sub-jet of water is associated with a separate k-factor.

Figure 4:
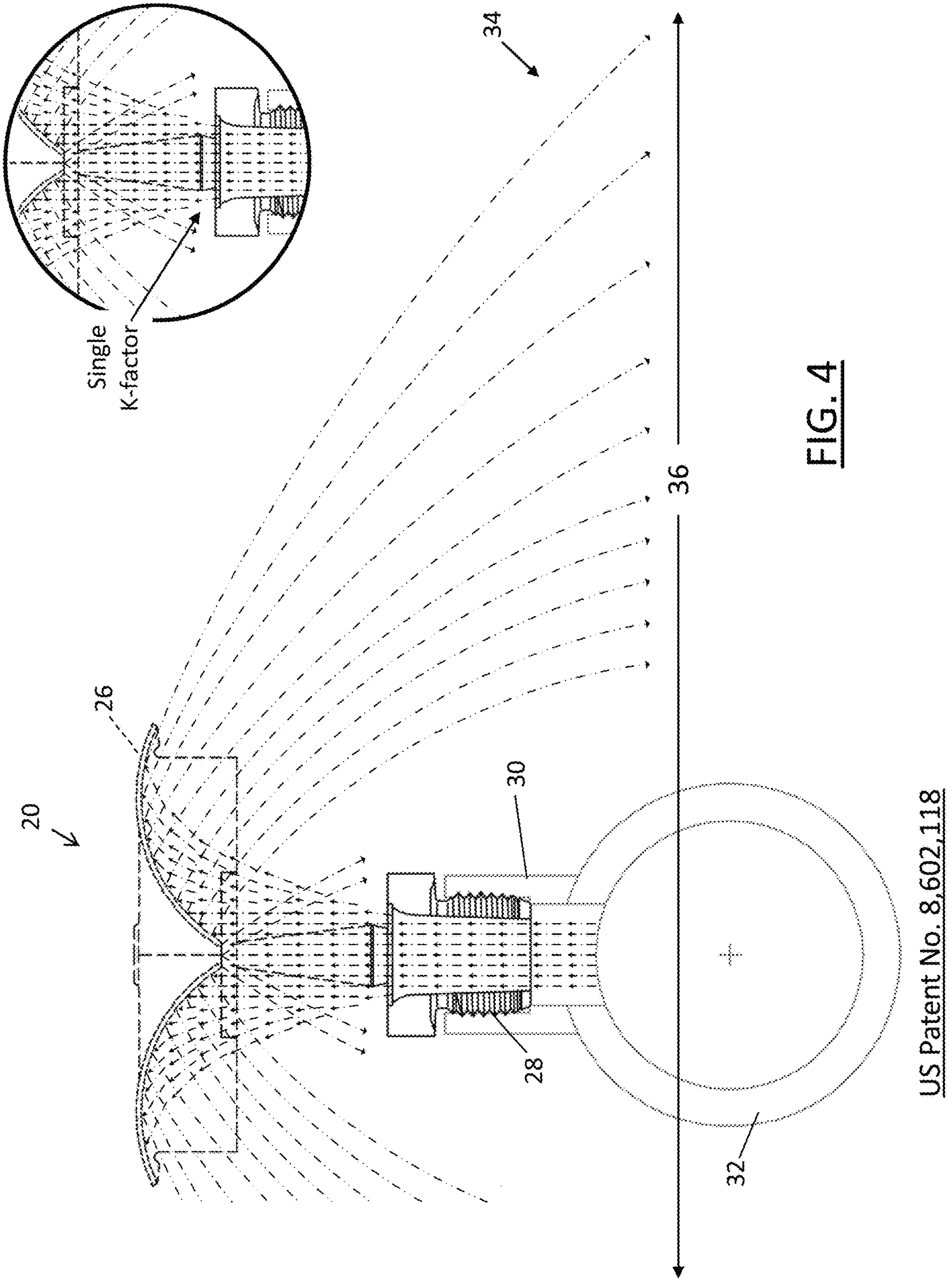
FIG. 4 corresponds to the left-hand sprinkler of FIG. 2.
Figure 5:
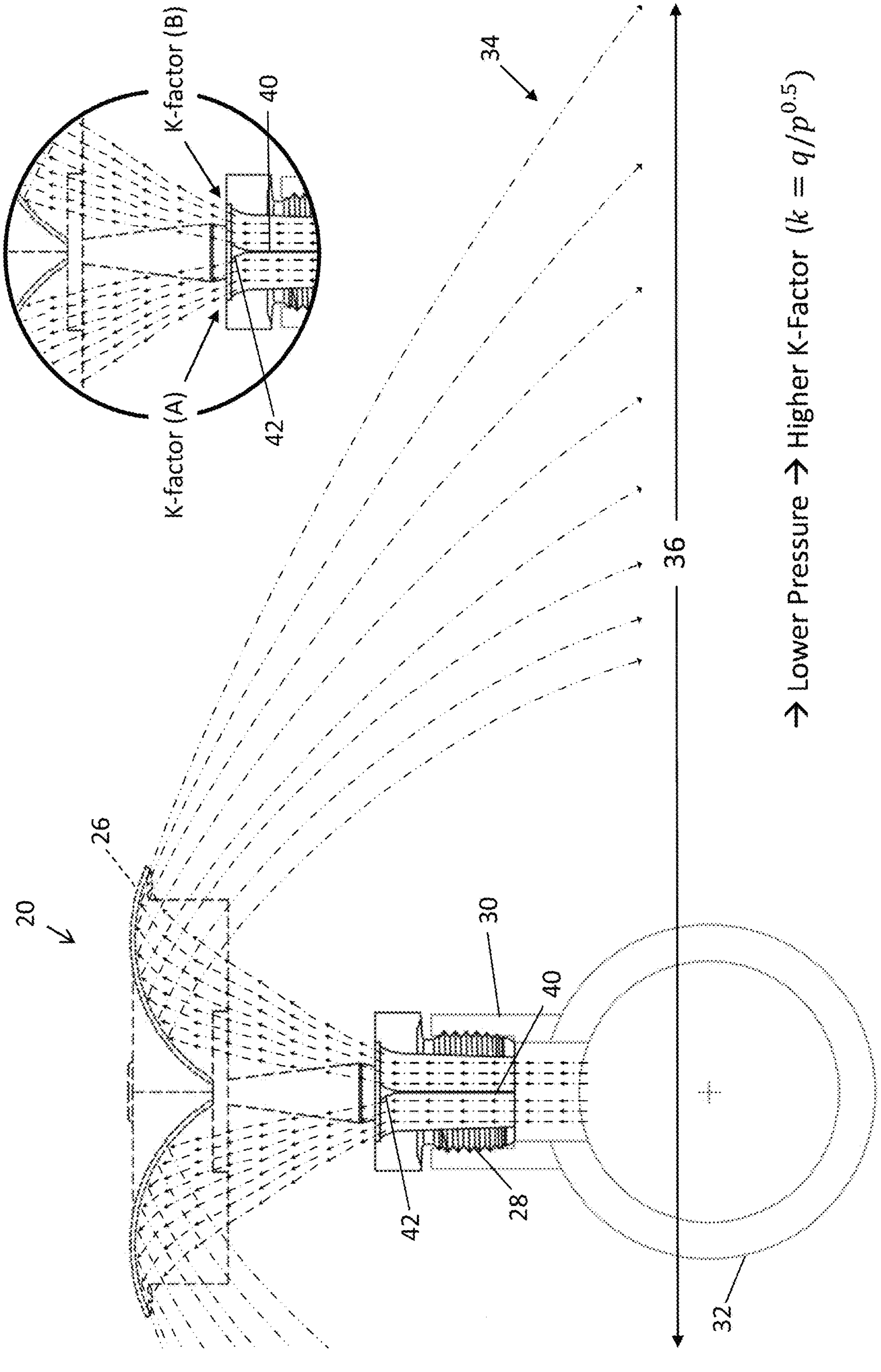
FIG. 5 depicts a sprinkler having two distinct water jets.

In the illustrated example of FIG. 4, which corresponds to the left-hand sprinkler 20 of FIG. 2 that does not divide the water stream emanating from the nipple 28, a single k-factor is assigned. This example is consistent with prior art sprinkler heads in which a single k-factor is associated. By comparison, the sprinkler 20 of this present invention is depicted in FIG. 5 having two separate and distinct water jets, each associated with its own k-factor—labeled k-factor (A) and k-factor (B). The splitter 40 thus acts like a flow separator in the nipple orifice that redirects the two separate water streams onto the deflector 26, so that less pressure is required resulting in more economical system smaller pipe size, less labor etc.

Returning to FIG. 3, the splitter 40 is shown disposed along the axial centerline of the nipple orifice and separates the exiting flow of water into two separate, and substantially equal flows of water. Each flow has its own k-factor (A or B). The k-factors (A and B) are substantially equal. In other words, if the one k-factor (A) is 85, then the other k-factor (B) is also 85. The splitter 40 is shown including a wedge feature 42 at its upper or terminal end. The wedge 42 imparts a lateral vector to each sub-jet of water that more naturally and more efficiently encounters the arc pair of the deflectors 36 responsible for the major diameter 36 portion of the coverage area 34.

Figure 6:
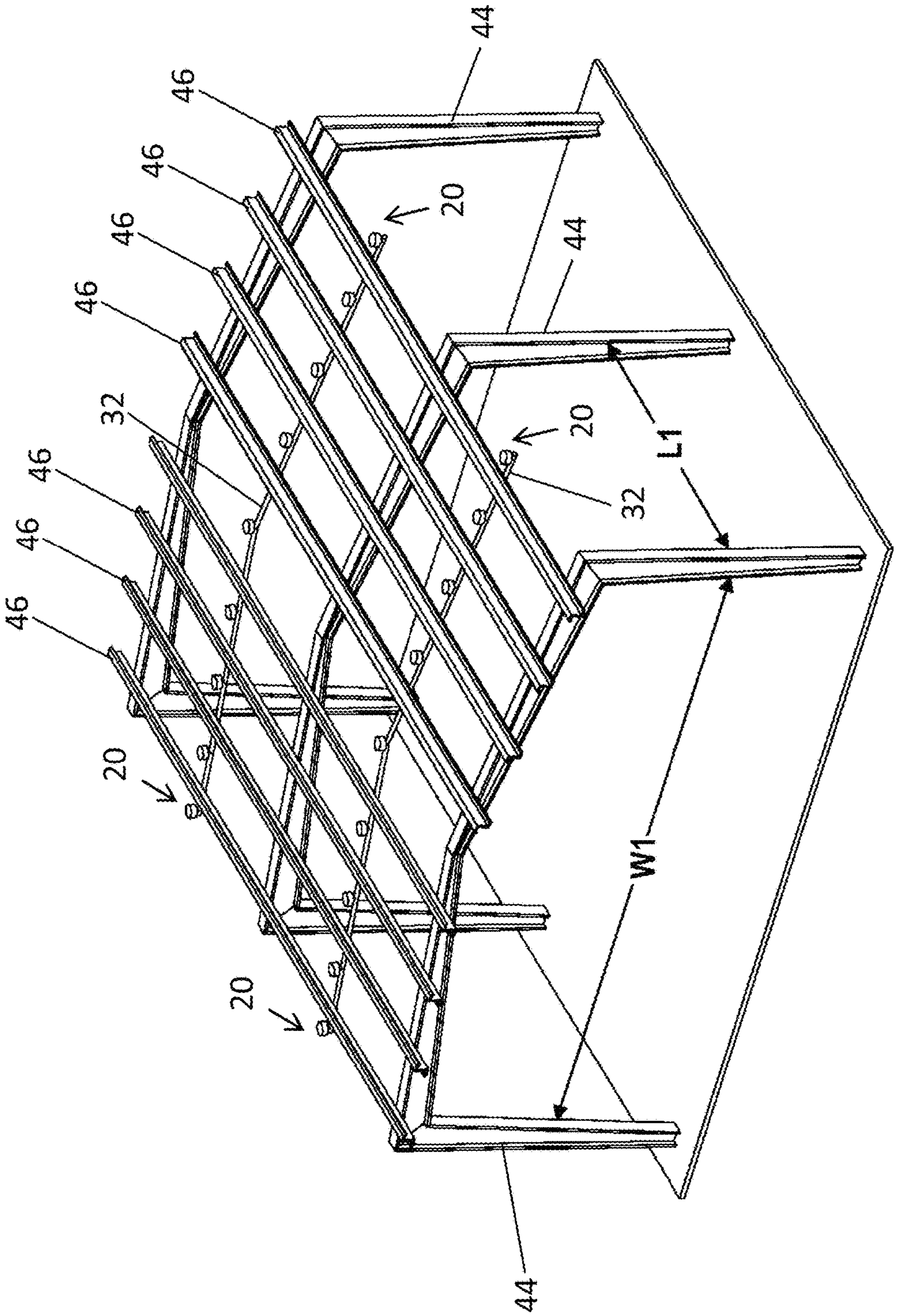
FIG. 6 illustrates a view like that shown in FIG. 3 of my U.S. Pat. No. 8,602,118.
Figure 7:
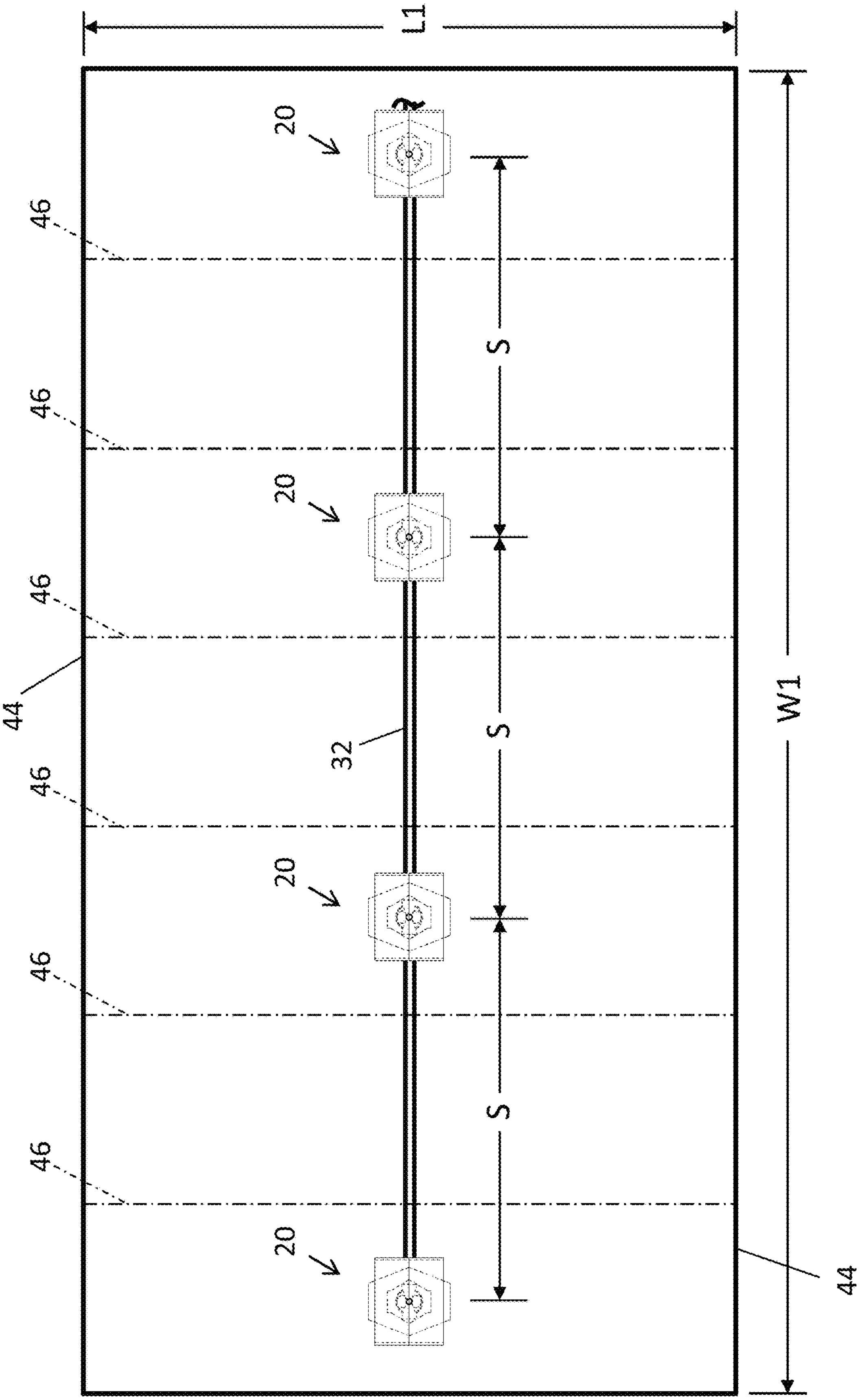
FIG. 7 depicts a sprinkler system in a structure having a bay area defined a width W1 and a length L1.

FIGS. 6-8 depict the sprinkler 20 of this invention installed in a system in a structure having one or more bay areas each defined a width W1 of suitable dimension (depending on fire testing) and a length L1 of suitable dimension (again, depending on fire testing). Dimensionally, the relative W1 and L1 measures may conform to, or even favorably exceed, the relative bay area dimensions set forth in my U.S. Pat. No. 8,602,118. For but one example, the bay area may include trusses or beams 44 that have a spacing (L1) of about 6 m and a span (W1) of at least 6 m. The fire sprinkler system thus comprises, for each pair of adjacent trusses or beams 44, a single supply line 32 extending in parallel with and positioned equidistant between the beams 44, such that each bay area only includes one supply 32. A roof (not shown in FIG. 6) typically covers the bay area and may be further supported by a network of perpendicular purlins 46 or any suitable structural members to help distribute the weight of the roof between the beams 44. The beams/trusses 44 and purlins 34 may be fabricated from any suitable material, and may be shaped in any suitable manner.

A series of sprinklers 20 are connected to the supply line 32 and are spaced apart from one another by a design distance S which has been calculated effective to disperse water, for each sprinkler 20, over an underlying coverage area 34. In one embodiment of this invention, the coverage area 34 has a width (38) that is less than—33% of its length (36). In other embodiments, the coverage area 34 may have other proportions including a width (38) that is generally equal to its length (36), as in the case of circular and square patterns. Although this description of the serviced space suggests one preferred installation in a metal building, such as a warehouse or other commercial structure, the sprinkler 20 concepts of this invention may be installed in any suitable shelter or space.

A first alternative embodiment of the present invention is shown in FIG. 9. In this example, the nipple 28 is provided with a plurality of turning vanes 48 that act in cooperation with the splitter 40 to help smoothly direct water laterally toward the arced deflector 26. Three (3) turning vanes 48 are shown in each half of the nipple 28 (i.e., associated with the respective k-factors A and B), however fewer or more turning vanes 48 could be used in actual practice depending upon the application so as to make an effective reduction in the resistance and turbulence of each water sub-jet.

Figure 10:
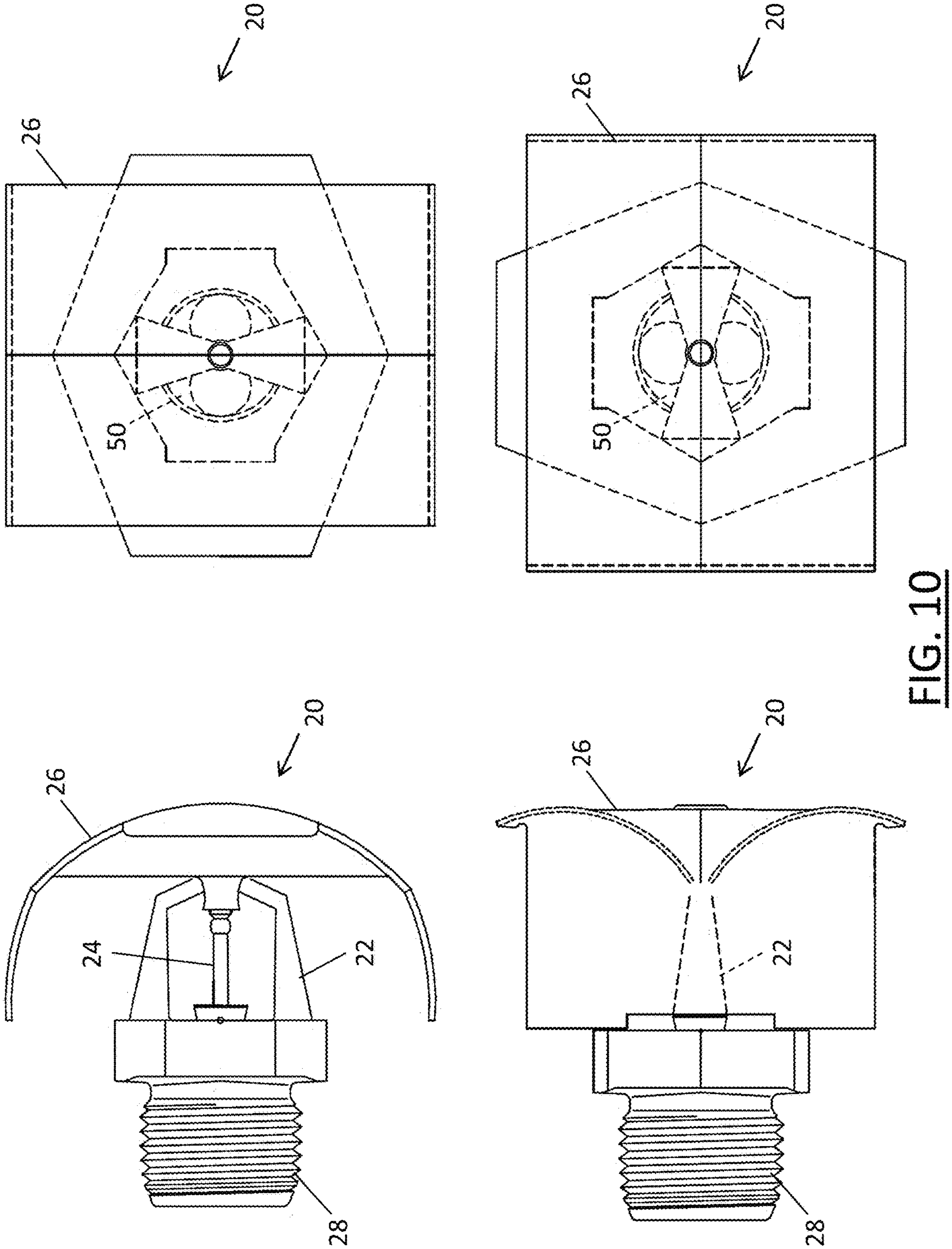
FIGS. 10-11 show a second alternative embodiment of the present invention.
Figure 11:
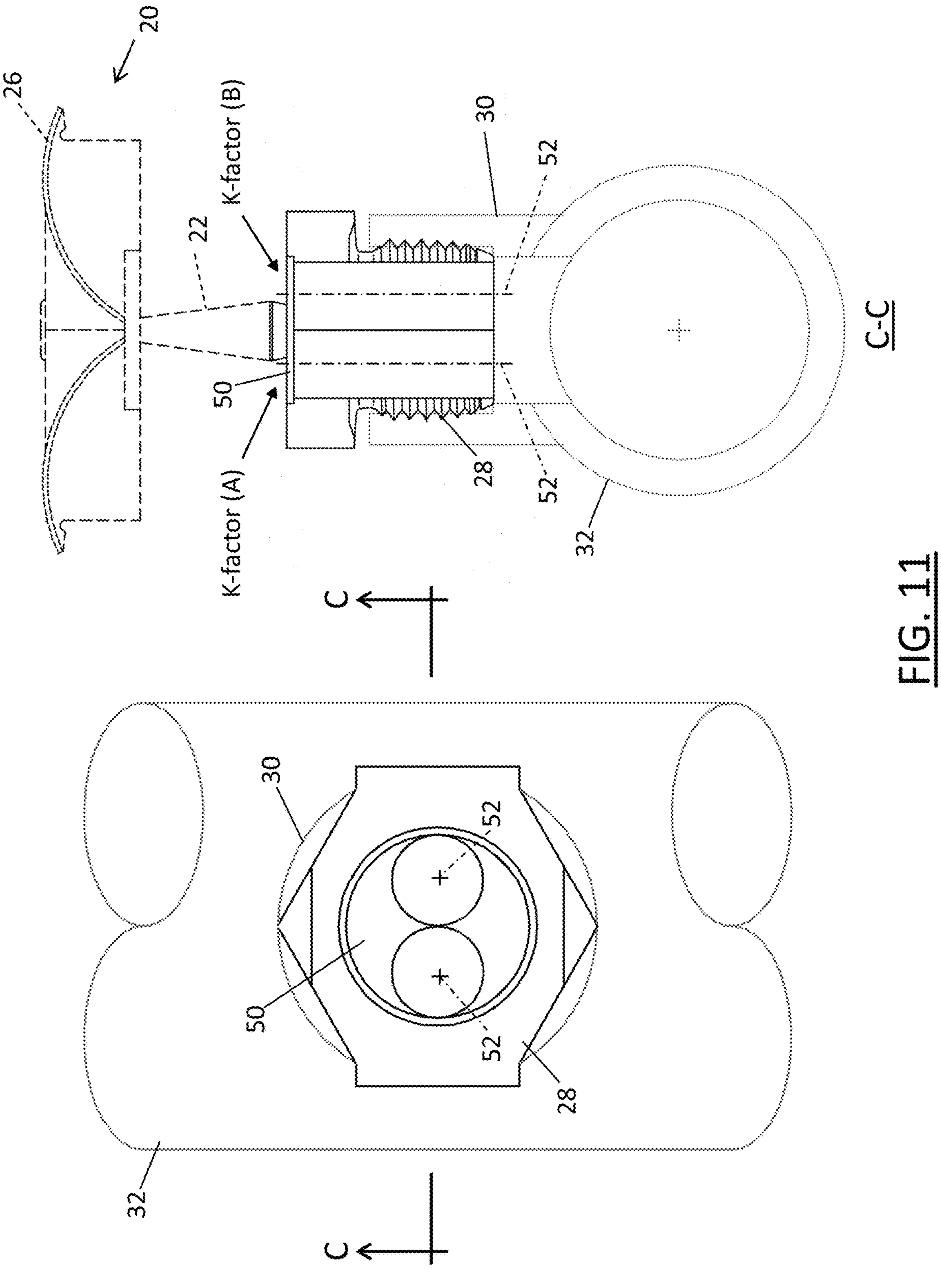

A second alternative embodiment of the present invention is shown in FIGS. 10-11. In this example, the splitter in the orifice of the nipple 28 is replaced with a two-hole insert 50. While phrased as an "insert" to suggest the possibility for a retrofit installation into prior art style sprinklers, it will be appreciated that the two-hole design of FIGS. 10 and 11 could be an integral formation of the nipple 28 and thus sold as an OE (Original Equipment) item. The two holes are substantially identical in size and shape, and are spaced laterally relative to the supply line 32 centerline. That is, each hole in the insert 50 has a respective centerline 52, and the two hole centerlines 52 are offset on either side of the supply line 32 centerline in the direction of the major diameter 36. The two hole centerlines 52 are shown here as being arranged parallel to one another, but in an alternative embodiment could be skewed and/or shaped so as to establish diverging sub-jets of water having engineered properties. As in the preceding examples, the sprinkler 20 of this embodiment separates the exiting flow of water into two separate, and substantially equal flows of water. Each flow has its own k-factor (A or B). The k-factors (A and B) are substantially equal.

Figure 12:
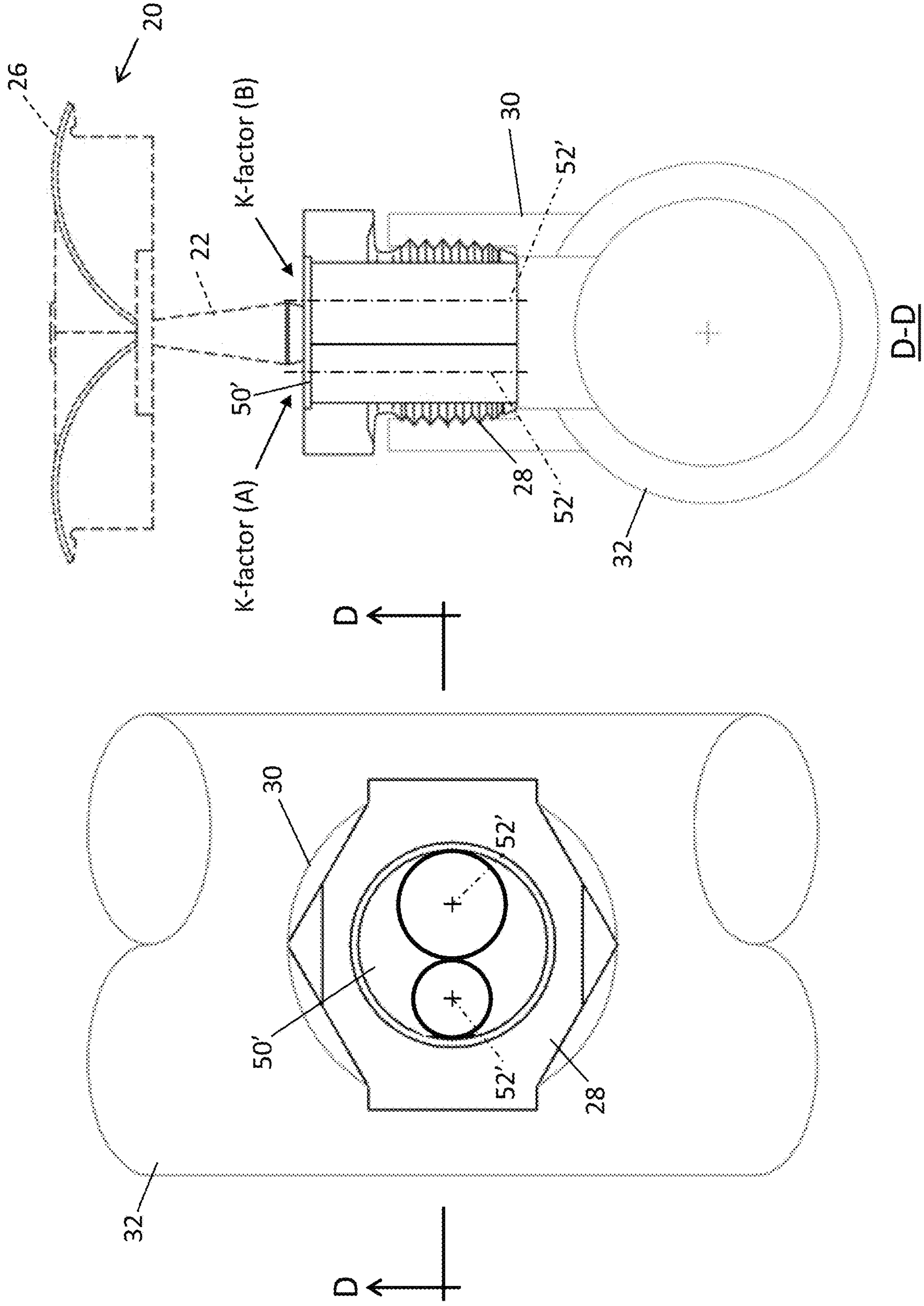
FIGS. 12-13 show a third alternative embodiment of the present invention.
Figure 13:
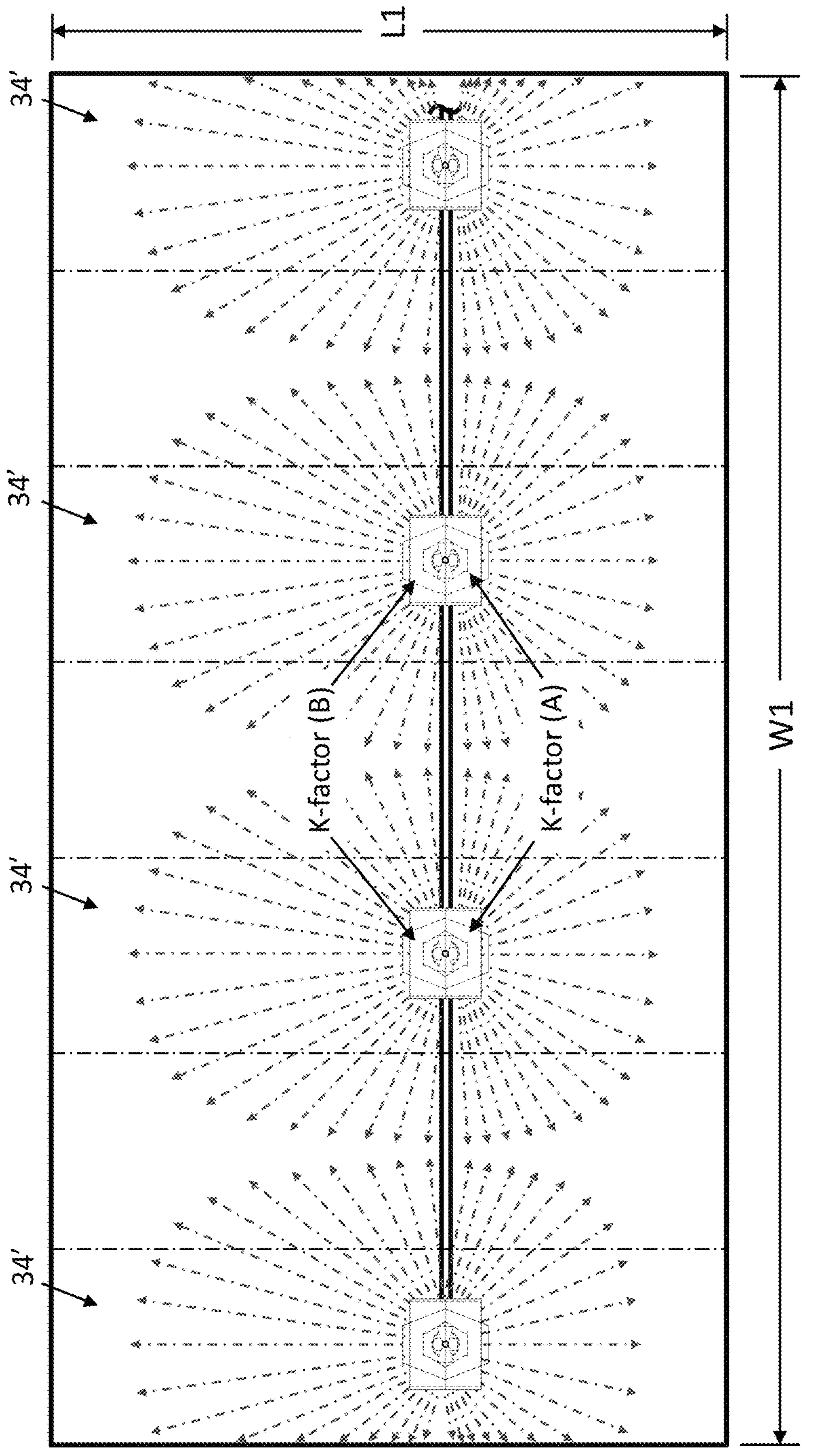

A third alternative embodiment of the present invention is shown in FIGS. 12-13. In this example, which is a variation of the second example (FIGS. 10-11), the insert 50' is formed with two (2) separate holes to create two (2) dissimilar k-factors. As shown here, k-factor (A) will be smaller than k-factor (B). FIG. 13 provides a simplified illustration of a coverage area 34' in which k-factor (A) is smaller than k-factor (B). As can be seen, rather than elliptical, the coverage area 34' has more of an egg-shape which may be advantageous in certain applications.

Figure 14:
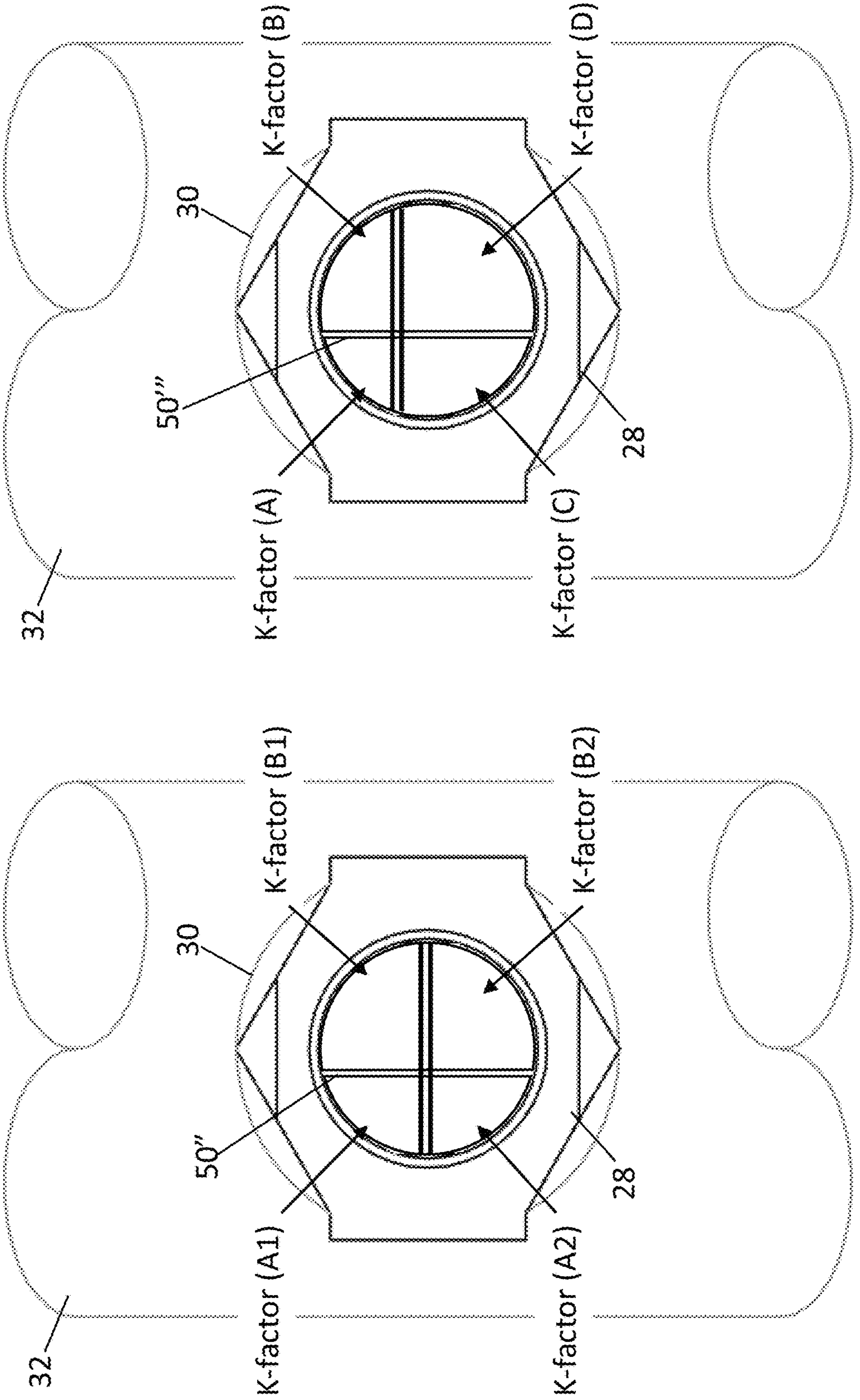
FIGS. 14-15 show a fourth and fifth alternative embodiments of the present invention.
Figure 15:
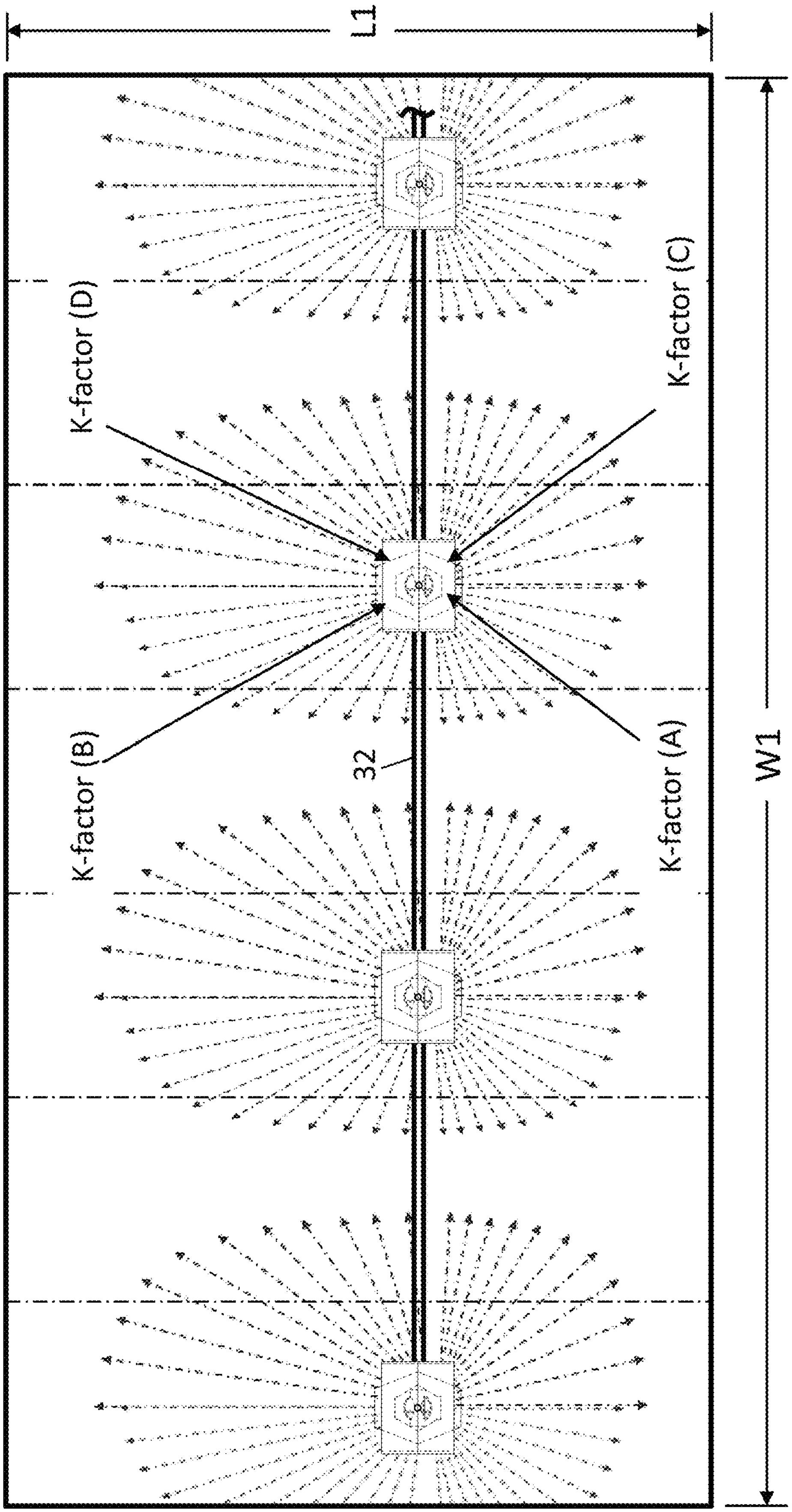

Fourth and fifth alternative embodiments of the present invention is shown in FIGS. 14-15. In these examples, the insert 50" and 50'" is formed with four (4) separate holes to create four (4) separate k-factors. Each sub-jet of water (one sub-jet from each hole) is directed to a different arc in the deflector 26. In the example of the left-hand side of FIG. 14, the insert 50" has two holes associated with one half of the major diameter 36 that possess separate but equal k-factors (A1 and A2), and two holes associated with the other half of the major diameter 36 that possess separate but equal k-factors (B1 and B2). This configuration will produce a coverage area similar to that shown in FIG. 13. In the example of the right-hand side of FIG. 14, the insert 50'" has two holes associated with one half of the major diameter 36 that possess separate an un-equal k-factors (A and C), and two holes associated with the other half of the major diameter 36 that possess separate an un-equal k-factors (B and D). This configuration will produce a coverage area similar to that shown in FIG. 15, which can be tailored to suit specific applications. The unique deflector 26 (including all of the configurations disclosed in my U.S. Pat. No. 8,602,118 will benefit from the principles of this invention wherein the sprinkler 20 includes multiple k-factors.

In yet another variation of this invention (not shown), two circumferentially-spaced holes can be drilled in the supply line 32 in conjunction with placement of the saddle 30 so that water exiting the supply line 32 is pre-divided into separate sub-jets prior to entering the nipple 28. In this case, the nipple 28 may include the splitter feature described above, or instead may rely on the separate holes to provide the multiple k-factor effect. In either case, more efficient distribution of water can be achieved by the multiple k-factor properties of this sprinkler concept.

Figure 16:
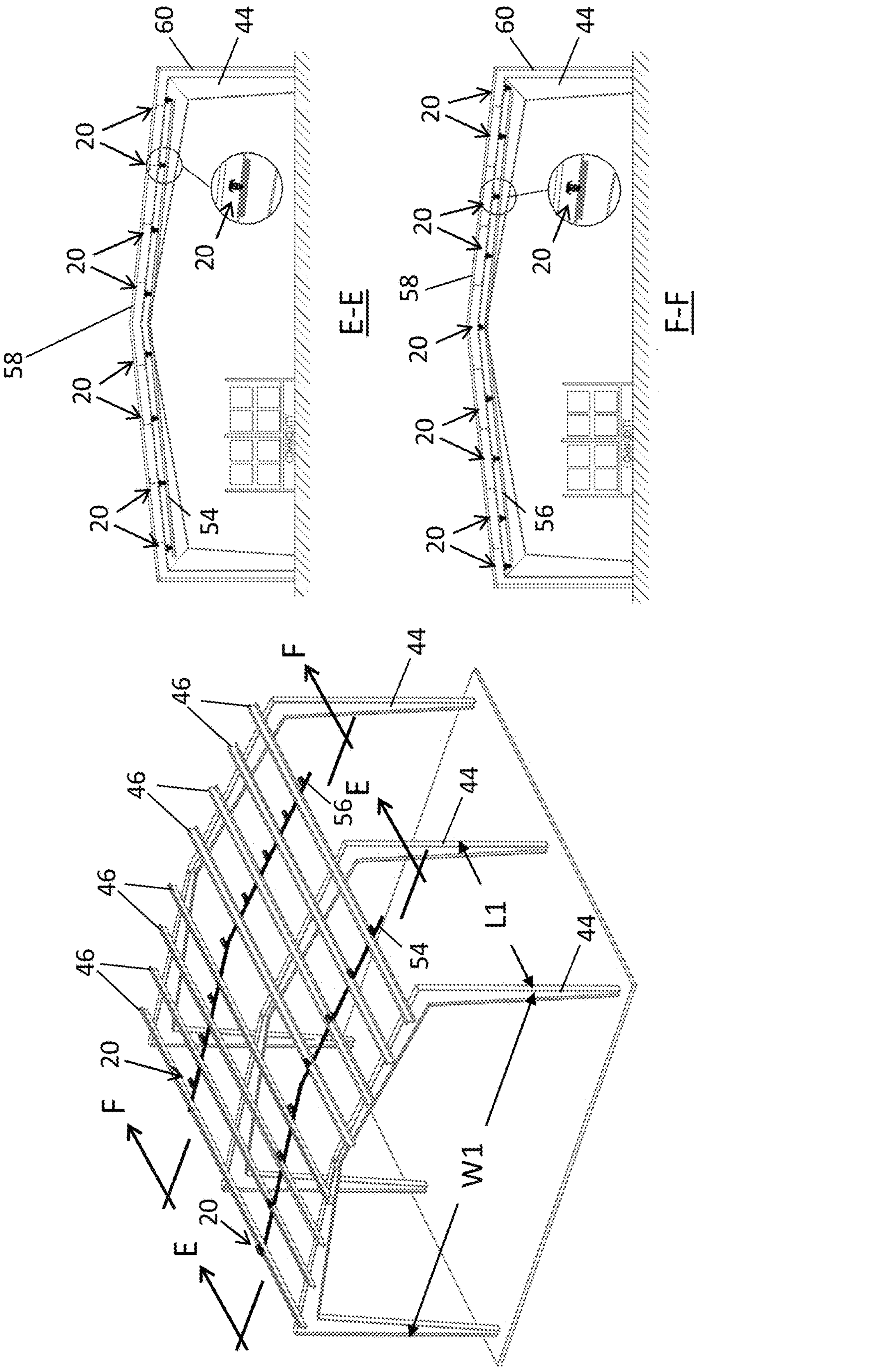
FIG. 16 depicts the sprinklers installed in an optional stagger spaced system.
Figure 17:
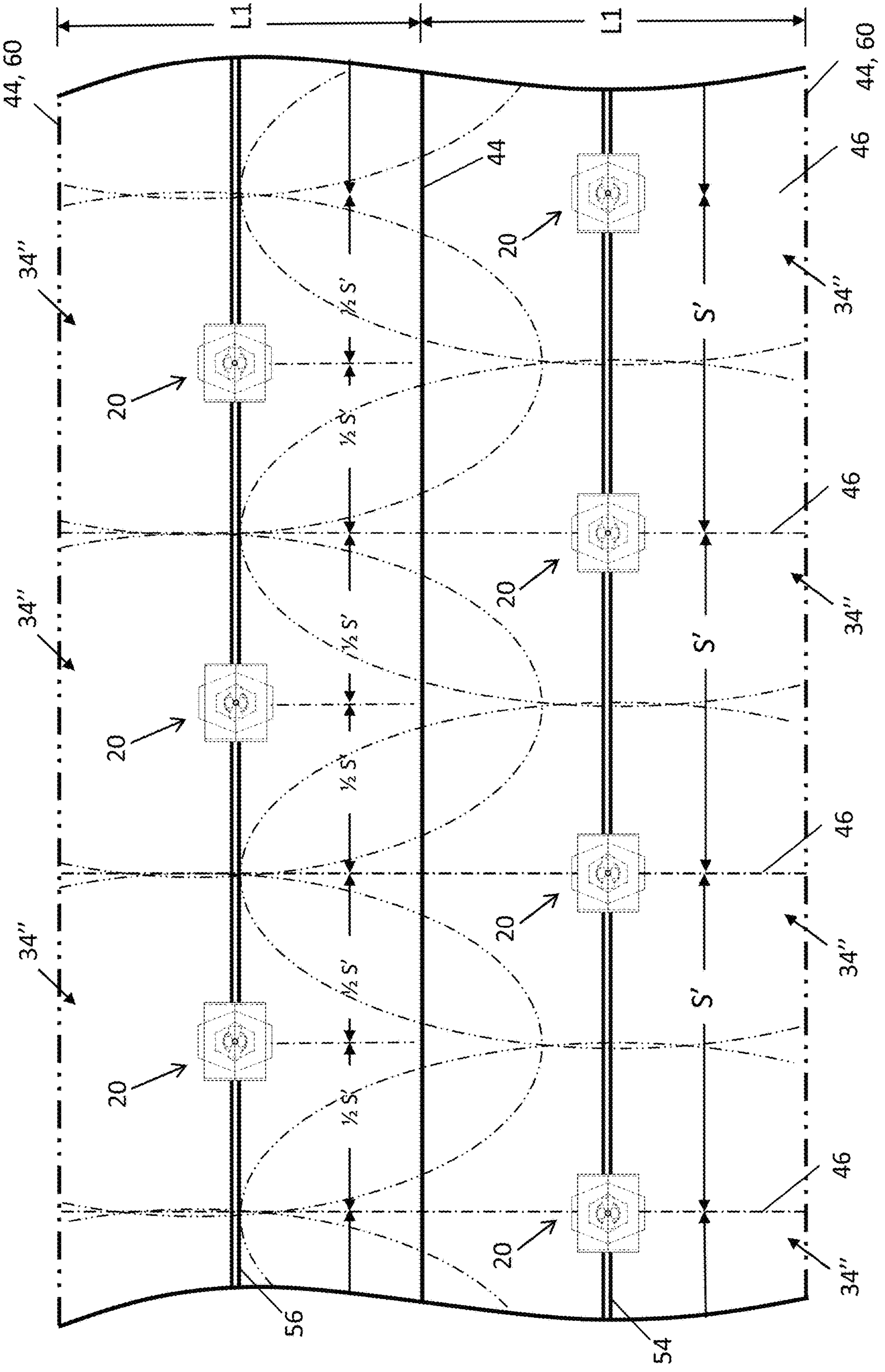
FIG. 17 shows a simplified illustration of stagger spacing arrangement of FIG. 16 in two adjacent bays.

FIGS. 16-17 depict the sprinklers 20 of this invention installed in an optional stagger spaced system in the structure having one or more bay areas each defined by a width W1 of suitable dimension and a length L1 of suitable dimension. The stagger spaced system is designed to redirect the sprays of water into the structure with strategically overlapped coverage areas. The stagger spaced system comprises, for each pair of an adjacent trusses or beams 44, first 54 and second 56 branch lines extending in parallel with and positioned equidistant between the beams 44, such that one bay area includes the first branch line 54 and the adjacent bay area includes the second branch line 56. A common roof 58 typically covers the bay areas and may be further supported by a network of perpendicular purlins 46 or any suitable structural members above the walls 60 to help distribute the weight of the roof 58 between the beams 44.

A series of sprinklers 20 are connected to the first 54 and second 56 branch lines. A first series of sprinklers 20 lay along the first branch line 54 and a second series of sprinklers 20 are set along the second branch line 56. The first series of sprinklers 20 along the first branch line 54 are arranged in an offset relationship relative to the second series of sprinklers 20 along the second branch line 56 so that the sprinklers 20 of one branch line 54 are not longitudinally (i.e., along the length L1) in line with the sprinklers 20 of the other branch line 56. Said another way, each sprinkler 20 on the first branch line 54 is laterally (i.e., along the width W1) offset from the sprinklers 20 on the second branch line 56. Thus, a person standing in the building and looking up toward the roof 60 along the length of the purlins 46 will observe that the sprinklers 20 on the first branch line 54 do not line up with the sprinklers 20 on the second branch line 56; they are in fact staggered in an alternating fashion.

FIG. 17 shows a simplified illustration of this stagger spacing arrangement in two adjacent bays, where the first 54 and second 56 branch lines are located generally mid-way between beams 44 separated by a distance of L1. The sprinklers 20 in this example have a single k-factor with elliptical coverage areas 34" similar in many respects to those described in my U.S. Pat. Nos. 8,602,118 and 8,733,461, the entire disclosures of which are hereby incorporated by reference. The coverage areas 34" represent the predicted water spray patterns from each sprinkler 20 of the first 54 and second 56 branch lines. Along the first branch line 54, each sprinkler 20 is spaced apart from the next adjacent sprinkler 20 by a design distance S' which has been calculated to disperse water over the underlying coverage area 34". The second series of sprinklers 20 in the second branch line 56 are arranged in-between the first series of sprinklers 20 (as viewed in the longitudinal (L1) direction) so that the series of sprinklers 20 in the first 54 and second 56 branch lines are spaced equally with the half distance (½ S'). In one example as shown in the perspective view of FIG. 16, the first series of sprinklers 20 in the first branch line 54 are located under the purlins 46 and the second series of sprinklers 20 in the second branch line 56 are alternatively centered between the purlins 46. Each coverage area 34" produced by the sprinklers 20 in the first 54 and second 56 branch lines is missed each other so that overlapped coverage areas (shown by overlapping arcs) are minimized. Thus, the coverage areas 34" can be achieved more efficiently by reducing the overlapped coverage areas by the flow of the water from the series of sprinklers between the first 54 and second 56 branch lines—as compared with circular discharge patterns typical in the prior art.

Figure 17A:
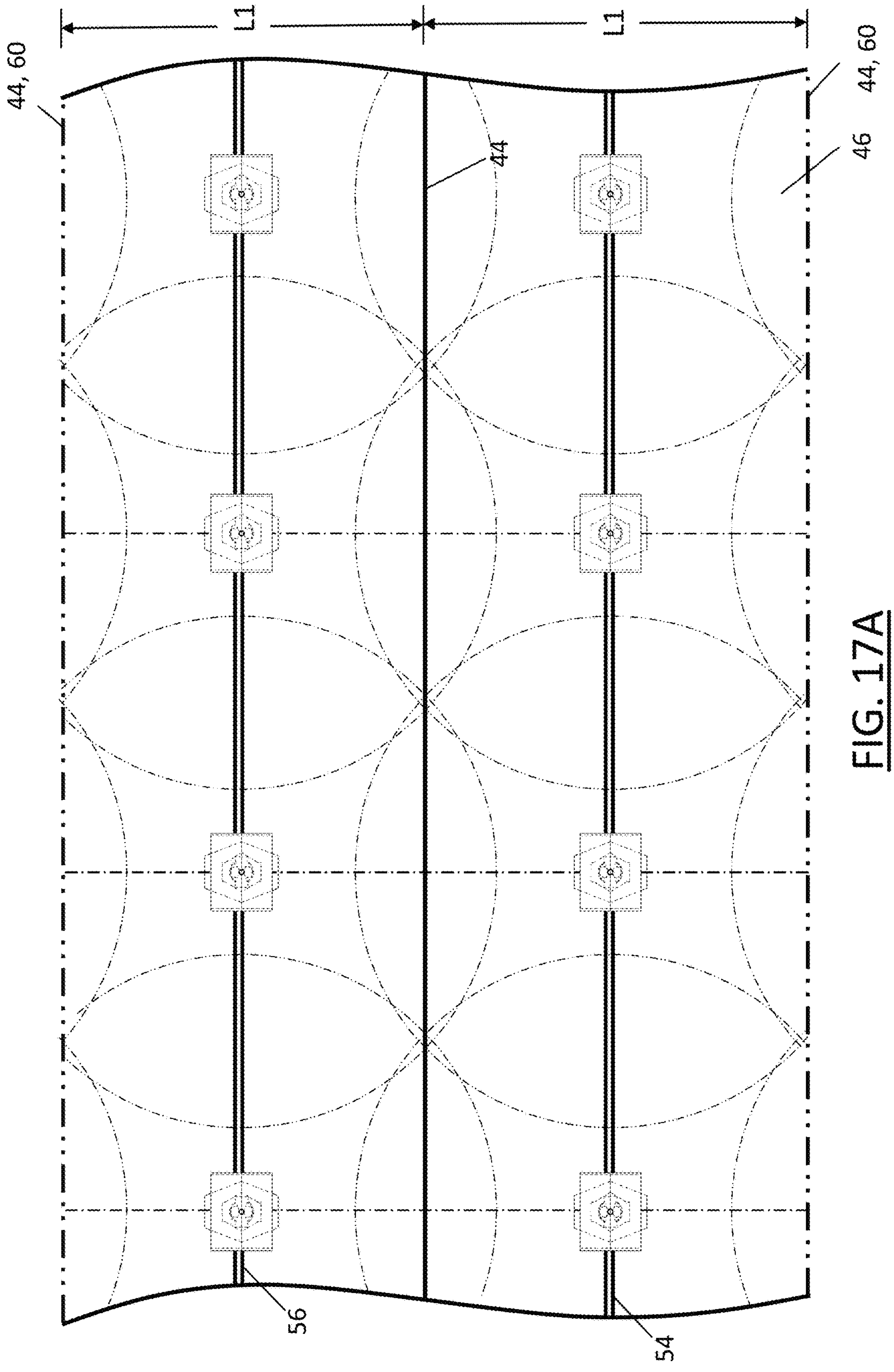
FIG. 17A Prior Art
FIG. 17A shows a typical prior art installation where circular spray patterns emanate from each sprinkler head.

Experimental data shows that in the overlapped coverage areas the sprays of water from adjacent sprinklers 20 collide with each other and dump twice as much water on the over-lapping areas. Thus, the overlapping sprays effectively result in waste due to redundant water sprays. As a result, higher water pressure and greater water carrying capacity (i.e., larger diameter pipes) are needed to support the redundant water sprays. FIG. 17A shows a typical prior art installation where circular spray patterns emanate from each sprinkler head. Note the substantial regions of spray overlap from adjacent sprinklers in these prior art circular spray patterns. The area of overlap regions shown here exceed the area of non-overlapping areas. Each overlap area represents waste in the form of added installation cost and added operational cost. If these redundant overlapping sprays could be reduced, then less water is required and less pressure needed to move the water. Accordingly, the less the overlapped coverage areas, the more efficient the water usage of the system. Prior art systems with circular spray patterns (like that shown in FIG. 17A) result in substantial overlapping areas and thus substantial redundancy and waste. The stagger spaced system of this invention, by contrast, strategically minimizes the overlapped coverage areas by optimally arranging the spaces among the sprinklers 20. In the example of FIG. 17, the major diameter of each coverage area 34" is optimally distributed into the cove or valley-like regions between the overlapping coverage areas in the two opposing sprinklers 20 of the adjacent branch line. Thus, the overlapped coverage areas by two opposing sprinklers 20 are reduced and accordingly, a more optimal use of water and water pressure is achieved.

In the example of FIG. 17, the minor diameter of each coverage area 34" is at least equal to S'. More preferably, the minor diameter for each coverage area 34" is between about S' and 2S' (i.e., between one and two times S'). In this example, the major diameter of each coverage area 34" is greater than L1 so that it reaches into the cove or valley-like region between the overlapping coverage areas 34" in the two opposing sprinklers 20 of the adjacent branch line. More preferably, the major diameter for each coverage area 34" is between about 1.5L1 and 4L1 (i.e., between one-and-a-half and four times L1). It is to be understood that the illustrated examples fully contemplate extension of these teachings to buildings have three and more bays, with the stagger spacing concepts being repeated with respect to each adjacent branch line. The large lateral reach in the major diameter direction can be particularly benefitted when installed in a structure fitted with open web type beams 44, such that the branch lines 54, 56 can be located very near to the ceiling with water sprays easily passing through the open webbings.

Figure 18:
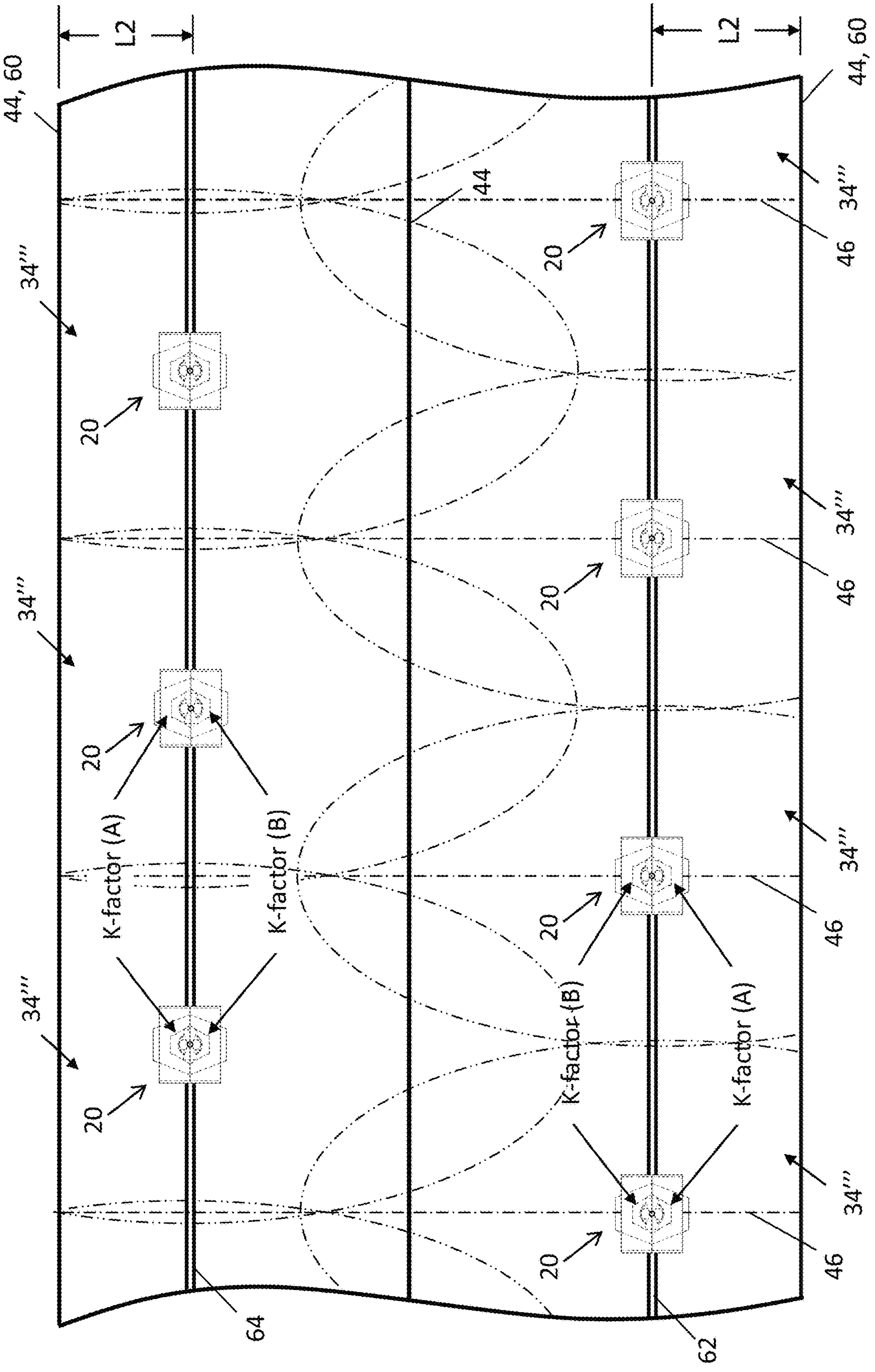
FIG. 18 shows a variation on the alternative stagger spaced system.

A variation on the alternative stagger spaced system is shown in FIG. 18 in which the sprinklers 20 have two k-factors and the branch lines 62, 64 are not centered within their respective bay areas. Rather, in this example, the branch lines 62, 64 are located relatively close to outer walls 60 and relatively distant from the centerline of the building (as represented by the central beam 44). In this example, the designers may conclude that locating the branch lines 62, 64 more closely to the outer walls 60 (i.e., by the distance L2, where L2 is smaller than ½ the perpendicular distance between the two branch lines 62, 64) will result in an optimization of system performance. In this example, each sprinkler 20 has at least two k-factors: k-factor (A) and k-factor (B), where the k-factor (A) is smaller than k-factor (B) so that a somewhat egg-shaped coverage area 34'" is produced. The sprinklers 20 in the first 62 branch line are arranged in an offset pattern relative to the sprinklers 20 of the second 64 branch lines. The smaller k-factors (A) are directed toward the walls 60 for each sprinkler 20. The large k-factors (B) produce far-reaching sprays that easily stretch into the cove-like regions formed by the two adjacent sprinklers 20 of the opposing branch line so that the entire floor space is adequately sprayed with water (or other liquid fire suppressing substance). Of course, many other configurations are possible especially considering the limitless variability afforded by the multiple k-factor concepts of this invention.

Figure 19A:
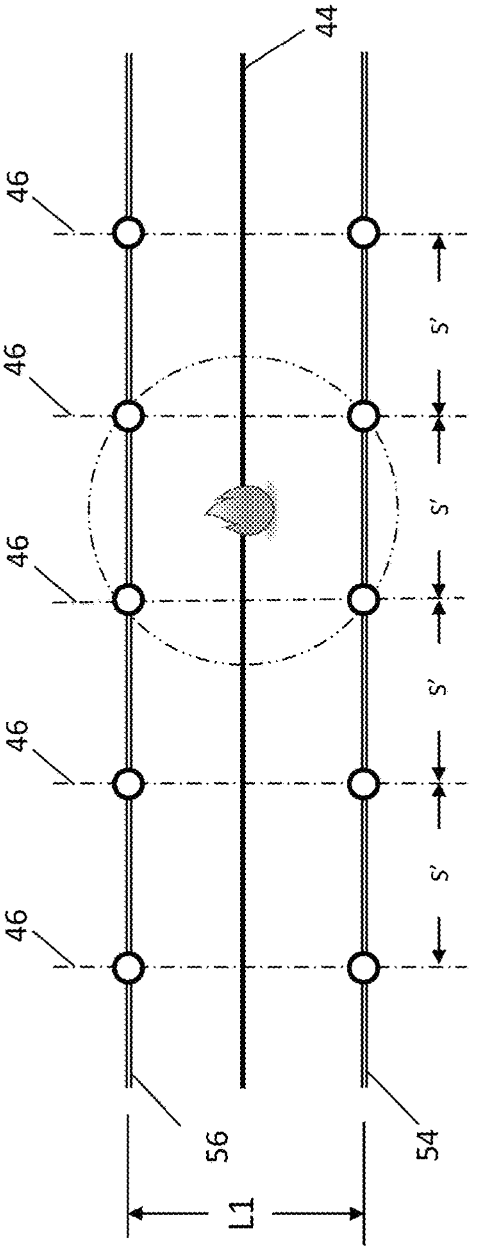
FIG. 19A Prior Art
FIG. 19A depicts a typical prior art sprinkle system with circular spray heads.

FIG. 19A depicts a typical prior art (non-stagger) sprinkle system with circular spray heads. A fire is shown breaking out in-between the two brand lines 54, 56 and in-between sprinkler heads. It will be appreciated that all four (4) adjacent sprinkle heads are simultaneously activated. This scenario results in four (4) sprinklers spraying. Water usage is substantial (due to four simultaneous head discharges) and the potential for collateral water damage is great.

Figure 19B:
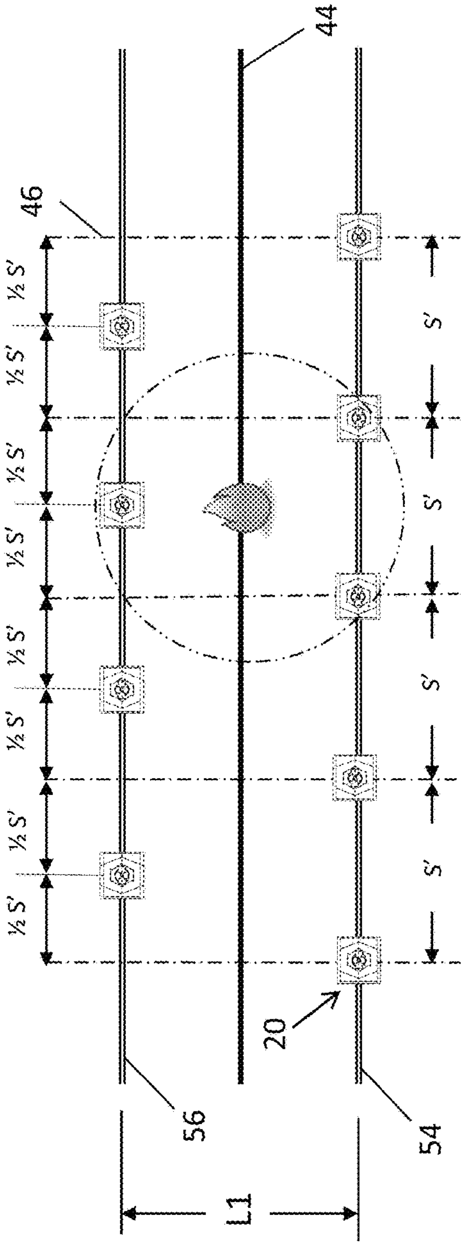
FIG. 19B is a similar view to FIG. 19A, but showing the stagger spacing feature of this present invention.

FIG. 19B is a similar view to FIG. 19A, but with the stagger spacing feature of this present invention. As in FIG. 19A, a fire is shown breaking out in-between the two brand lines 54, 56 and in-between sprinkler heads. Only three (3) adjacent sprinkle heads are simultaneously activated. This scenario results in only three (3) sprinklers spraying. Water usage is reduced (compared to the prior art) and the potential for collateral water damage is similarly reduced.

Figure 20:
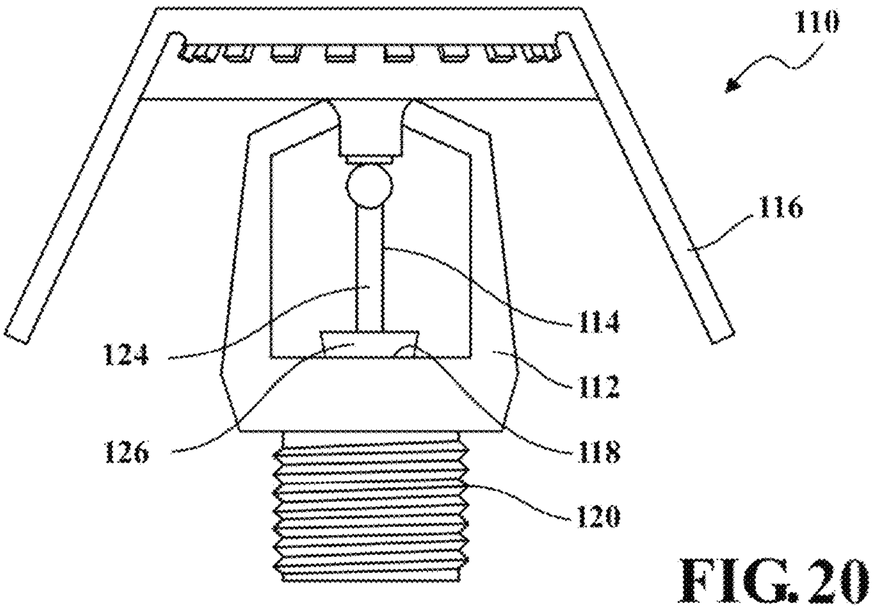
FIG. 20 illustrates a view like that shown in FIG. 1 of my U.S. Pat. No. 8,602,118.

As shown in FIG. 20, the fire sprinkler 110 includes a frame 112, a trigger 114, and a deflector 116. The frame 112 defines a duct 118 to exhaust the flow of a fire suppressing or extinguishing substance, and includes a fastener 120 to fasten the frame 112 to a supply line. The trigger 114 blocks the flow of the fire suppressing or extinguishing substance through the duct 118 during a first mode, and permits the flow of the fire suppressing or extinguishing substance during a second mode. The deflector 116 redirects the flow of the fire suppressing or extinguishing substance into a coverage area. The deflector 116 also at least partially shields the trigger 114 from the dispersal of a fire suppressing or extinguishing substance from an adjacent fire sprinkler 110 and prevents a failure of the trigger 114.

When the fire sprinkler 110 is located close to an adjacent fire sprinkler, the dispersal of a fire suppressing or extinguishing substance from the adjacent fire sprinkler may directly cool the fire sprinkler 110 and prevent the trigger 114 from properly responding to the fire and releasing the closure 126. As shown in FIG. 20, the deflector 116 of this embodiment also functions to reduce or eliminate this risk. Preferably, the deflector 116 accomplishes this function by at least partially shielding the trigger 114 from the dispersal of a fire suppressing or extinguishing substance from the adjacent fire sprinkler. Given that the duct 118 defines a first direction for the flow of the fire suppressing or extinguishing substance and the thermally responsive element 124 extends along this first direction, the deflector 116 preferably extends in a second direction, which is opposite the first direction, past at least a portion of the thermally responsive element 124. More preferably, as shown in FIG. 20, the deflector 116 extends in the second direction completely past the thermally responsive element 124. Alternatively, the deflector 116 may accomplish the function of reducing or eliminating the risk of cold soldering in any suitable method or design.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A fire protection sprinkler, comprising:

a nipple configured to connect with a water supply pipe, a frame extending from the nipple, a duct passing axially in an axial direction through the nipple and frame creating a flow path for a water jet exiting the supply pipe, a deflector mounted to the frame and spaced from the nipple, and a splitter in the form of a wedge disposed upstream of the deflector pro-actively separating the water jet into two distinct sub-jets before the water contacts the deflector;

wherein the nipple defines a fluid exit orifice at a downstream end thereof;

wherein the fluid exit orifice has a circular perimeter;

wherein the wedge includes a leading edge having radially outer ends, wherein a notational line defined between the radially outer ends defines a secant at least fully across the circular perimeter of the fluid exit orifice when viewed axially;

wherein all of the water jet generated in the nipple exits through the fluid exit orifice and flows past the wedge;

wherein when the sprinkler is vertically aligned and oriented such that the deflector is above the nipple, the deflector is angled downwardly on opposite lateral sides of the sprinkler and directs water downwardly along the angle of the deflector after the water contacts the deflector, wherein the deflector includes downwardly facing surfaces such that upwardly directed water of the water jet contacts the downwardly facing surfaces and is redirected downwardly;

wherein the deflector has a width greater than the length of the leading edge of the wedge;

wherein the nipple, the frame, and the deflector are fixed relative to each other such that the nipple, the frame, and the deflector remain in a fixed position during operation and do not move during operation;

wherein the wedge includes an upstream end and a downstream end, wherein the downstream end is wider than the upstream end;

wherein the wedge is oriented such that the leading edge extends along a first transverse axis that is perpendicular to the axial direction, such that the water is directed laterally outward from the wedge in opposite directions along a second transverse axis that is perpendicular to the first transverse axis and the axial direction, wherein the first and second transverse axes define a plane that is perpendicular to the axial direction;

wherein the width of the deflector extends along the first transverse axis, and a length of the deflector extends along the second transverse axis, wherein the deflector is angled downwardly on opposite sides of the first transverse axis, wherein the downward slope of the deflector extends downwardly along the second transverse axis, and water exits in an exit direction along the direction of the second transverse axis;

wherein the water jet is divided by the wedge such that it is directed in the opposite directions along the direction of the second transverse axis and redirected downwardly along the second transverse axis at the deflector;

wherein the leading edge of the wedge extends perpendicular to the exit direction of the water.

2. The fire protection sprinkler of claim 1, wherein the wedge has opposing curved features configured to impart a lateral vector to each sub-jet of water.

3. The fire protection sprinkler of claim 1, wherein the fluid exit orifice of the nipple defines an axial centerline along the flow path of the water jet exiting the supply pipe, the notational line of the leading edge of the wedge is disposed at the axial centerline to separate the exiting flow of water into substantially equal flows of water.

4. The fire protection sprinkler of claim 3, further including an elongated water supply pipe, the wedge oriented parallel to the elongated supply pipe.

5. The fire protection sprinkler of claim 1, wherein the fluid exit orifice of the nipple defines an axial centerline along the flow path of the water jet exiting the supply pipe, the wedge disposed to separate the exiting flow of water into unequal flows of water.

6. The fire protection sprinkler of claim 1, further including a plurality of turning vanes configured to act in cooperation with the wedge to help smoothly direct water laterally toward the deflector.

7. The fire protection sprinkler of claim 1, further including a trigger blocking the duct until activated by an elevated temperature.

8. The fire protection sprinkler of claim 1, wherein the deflector includes a pair of arcs configured to redirect the flow of water toward a non-circular underlying coverage area.

9. The fire protection sprinkler of claim 8, further including an elongated water supply pipe, wherein the non-circular coverage area is generally elliptical, having a major diameter and a minor diameter, the major diameter being oriented perpendicular to the length of the supply pipe.

10. The fire protection sprinkler of claim 1, wherein the fluid exit orifice of the nipple defines an axial centerline along the flow path of the water jet exiting the supply pipe, the wedge offset laterally from the axial centerline to separate the exiting flow of water into unequal flows of water.

11. The fire protection sprinkler of claim 1, wherein the nipple is connected to an elongated water supply pipe, wherein the wedge is disposed in the water flow path between the supply pipe and the deflector, wherein the sprinkler is oriented upwardly from the elongated water supply pipe, wherein the deflector is disposed above the wedge and the elongated water supply pipe.

12. The fire protection sprinkler of claim 11, wherein the wedge is oriented parallel to the elongated supply pipe.

13. The fire protection sprinkler of claim 11, wherein the wedge has opposing curved features configured to impart a lateral vector to each sub-jet of water.

14. The fire protection sprinkler of claim 11, wherein the nipple has a fluid exit orifice having a circular outer perimeter and defining an axial centerline along the flow path of the water jet exiting the supply pipe, the wedge disposed along the axial centerline to separate the exiting flow of water into substantially equal flows of water.

15. The fire protection sprinkler of claim 11, further including a trigger blocking the duct until activated by an elevated temperature.

16. The fire protection sprinkler of claim 11, wherein the nipple has a fluid exit orifice having a circular outer perimeter and defining an axial centerline along the flow path of the water jet exiting the supply pipe, the wedge offset laterally from the axial centerline to separate the exiting flow of water into unequal flows of water.

17. The fire protection sprinkler of claim 1, wherein the deflector includes a pair of flat angled surfaces configured to redirect the flow of water in opposite directions toward a non-circular underlying coverage area.

18. The fire protection sprinkler of claim 11, wherein the deflector includes a pair of flat angled surfaces configured to redirect the flow of water in opposite directions toward a non-circular underlying coverage area.

19. The fire protection sprinkler of claim 1, further comprising:

a trigger blocking the duct until activated by an elevated temperature, wherein the deflector includes a pair of flat angled surfaces configured to redirect the flow of water in opposite directions toward a non-circular underlying coverage area, and wherein the wedge has opposing curved features configured to impart a lateral vector to each sub-jet of water, the wedge disposed along the axial centerline to separate the exiting flow of water into substantially equal flows of water;

wherein the downstream end of the wedge is disposed relative to the exit orifice such that the flow of water does not pass through a subsequent downstream orifice after flowing past the wedge so that the substantially equal flows of water are free to contact the deflector.

20. The fire protection sprinkler of claim 1, wherein the deflector extends at least completely laterally across the fluid exit orifice when viewed axially such that water projected upwardly through the perimeter of the fluid exit orifice toward the deflector does not pass through the deflector.

21. The fire protection sprinkler of claim 1, wherein, when viewed axially, the wedge extends at least fully across a maximum width of a bore defined within the nipple.

22. The fire protection sprinkler of claim 1, wherein the wedge is separately formed relative to the deflector.

23. The fire protection sprinkler of claim 22, wherein the nipple and frame are part of a cohesive unitary body, and the defector is separately attached to the unitary body.

24. The fire protection sprinkler of claim 1, wherein the deflector includes a downwardly facing upper surface and side portions extending downwardly from the upper surface.

25. The fire protection sprinkler of claim 24, wherein the wedge directs the sub-jets laterally outwardly transverse to a leading edge of the wedge before contacting the deflector such that spray from the sub-jets is wider than the fluid exit orifice when the sub-jets contact the upper surface of the deflector.

26. The fire protection sprinkler of claim 1, wherein the fire protection sprinkler defines a central axis extending axially through the nipple between inlet and outlet ends thereof, wherein the deflector has an asymmetrical shape about the central axis, such that the width of the deflector measured parallel to the leading edge of the wedge is smaller than a length of the deflector measured perpendicular to the leading edge of the wedge.

27. The fire protection sprinkler of claim 1, wherein the wedge has a non-convex shape with non-convex outer surfaces.

28. The fire protection sprinkler of claim 1, wherein the downstream end of the wedge extends across the entire flow path.

29. A fire protection sprinkler, comprising:

a nipple configured to connect with a water supply pipe, a frame extending from the nipple, a duct passing axially through the nipple and frame creating a flow path for a water jet exiting the supply pipe, a deflector mounted to the frame and spaced from the nipple, and a wedge disposed upstream of the deflector pro-actively separating the water jet into two distinct sub-jets before the water contacts the deflector;

wherein the nipple defines a fluid exit orifice at a downstream end thereof;

wherein the fluid exit orifice has a circular perimeter;

wherein the wedge includes a leading edge having radially outer ends, wherein a notational line defined between the radially outer ends defines a secant at least fully across the circular perimeter of the fluid exit orifice when viewed axially;

wherein all of the water jet generated in the nipple exits through the fluid exit orifice and flows past the wedge;

wherein when the sprinkler is vertically aligned and oriented such that the deflector is above the nipple, the deflector is angled downwardly on opposite lateral sides of the sprinkler and directs water downwardly along the angle of the deflector after the water contacts the deflector, wherein the deflector includes downwardly facing surfaces such that upwardly directed water of the water jet contacts the downwardly facing surfaces and is redirected downwardly;

wherein the deflector has a width greater than the length of the leading edge of the wedge;

wherein the wedge divides the water jet exiting the fluid exit orifice and all of the water of the water jet that flows past the wedge into only two substantially equal flows that flow past the wedge;

wherein the wedge has a non-convex shape with non-convex outer surfaces;

wherein the wedge is oriented such that the leading edge extends along a first transverse axis that is perpendicular to the axial direction, such that the water is directed laterally outward from the wedge in opposite directions along a second transverse axis that is perpendicular to the first transverse axis and the axial direction, wherein the first and second transverse axes define a plane that is perpendicular to the axial direction;

wherein the width of the deflector extends along the first transverse axis, and a length of the deflector extends along the second transverse axis, wherein the deflector is angled downwardly on opposite sides of the first transverse axis, wherein the downward slope of the deflector extends downwardly along the second transverse axis, and water exits in an exit direction along the direction of the second transverse axis;

wherein the water jet is divided by the wedge such that it is directed in the opposite directions along the direction of the second transverse axis and redirected downwardly along the second transverse axis at the deflector;

wherein the leading edge of the wedge extends perpendicular to the exit direction of the water.

30. The fire protection sprinkler of claim 29, wherein the wedge includes a trailing edge, wherein the trailing edge is wider than the leading edge, wherein the trailing edge of the wedge extends across the entire flow path.

* * * * *